US011149610B2

(12) United States Patent
Li et al.

(10) Patent No.: US 11,149,610 B2
(45) Date of Patent: Oct. 19, 2021

(54) NITROUS OXIDE REMOVAL CATALYSTS FOR EXHAUST SYSTEMS

(71) Applicant: BASF Corporation, Florham Park, NJ (US)

(72) Inventors: Yuejin Li, Edison, NJ (US); Xiaolai Zheng, Princeton Junction, NJ (US); Stanley Roth, Yardley, PA (US); Olga Gerlach, Ludwigshafen (DE); Andreas Sundermann, Bensheim (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 16/838,751

(22) Filed: Apr. 2, 2020

(65) Prior Publication Data

US 2020/0232366 A1    Jul. 23, 2020

Related U.S. Application Data

(62) Division of application No. 15/532,751, filed as application No. PCT/US2015/064484 on Dec. 8, 2015, now Pat. No. 10,634,030.

(Continued)

(51) Int. Cl.
  *B01J 23/10* (2006.01)
  *B01J 23/46* (2006.01)
  (Continued)

(52) U.S. Cl.
  CPC ....... *F01N 3/2066* (2013.01); *B01D 53/9427* (2013.01); *B01J 23/10* (2013.01);
  (Continued)

(58) Field of Classification Search
  CPC . B01J 23/10; B01J 23/464; B01J 23/63; B01J 35/0006; B01J 35/04; B01J 35/1038;
  (Continued)

(56) References Cited

U.S. PATENT DOCUMENTS 4,476,246 A   10/1984  Kim et al.
4,492,770 A    1/1985  Blanchard et al.
(Continued)

FOREIGN PATENT DOCUMENTS

DE    102008048159    4/2010
ES         2356459    4/2011
(Continued)

OTHER PUBLICATIONS

Beyer et al. "Decomposition of Nitrous Oxide by Rhodium Catalysts: Effect of Rhodium Particle Size and Metal Oxide Support." *Applied Catalysis A: General*, 2010, vol. 391, Issues 1-2, pp. 411-416.

(Continued)

*Primary Examiner* — Cam N. Nguyen
(74) *Attorney, Agent, or Firm* — Finnegan, Henderson, Farabow, Garrett & Dunner, LLP

(57) ABSTRACT

A nitrous oxide ($N_2O$) removal catalyst composite is provided, comprising a $N_2O$ removal catalytic material on a substrate, the catalytic material comprising a rhodium (Rh) component supported on a ceria-based support, wherein the catalyst composite has a $H_2$-consumption peak of about 100° C. or less as measured by hydrogen temperature-programmed reduction ($H_2$-TPR). Methods of making and using the same are also provided.

6 Claims, 12 Drawing Sheets

Related U.S. Application Data

(60) Provisional application No. 62/088,888, filed on Dec. 8, 2014.

(51) Int. Cl.

| | | |
|---|---|---|
| B01J 23/63 | (2006.01) | |
| B01J 35/00 | (2006.01) | |
| B01J 35/04 | (2006.01) | |
| B01J 35/10 | (2006.01) | |
| B01J 37/02 | (2006.01) | |
| B01J 37/08 | (2006.01) | |
| F01N 3/08 | (2006.01) | |
| F01N 3/20 | (2006.01) | |
| B01D 53/94 | (2006.01) | |
| B01J 23/52 | (2006.01) | |
| B01J 23/42 | (2006.01) | |
| B01J 23/44 | (2006.01) | |
| B01J 33/00 | (2006.01) | |
| F01N 3/10 | (2006.01) | |
| F01N 3/28 | (2006.01) | |
| B01J 35/02 | (2006.01) | |

(52) U.S. Cl.
CPC .............. *B01J 23/42* (2013.01); *B01J 23/44* (2013.01); *B01J 23/464* (2013.01); *B01J 23/468* (2013.01); *B01J 23/52* (2013.01); *B01J 23/63* (2013.01); *B01J 33/00* (2013.01); *B01J 35/0006* (2013.01); *B01J 35/04* (2013.01); *B01J 35/1014* (2013.01); *B01J 35/1019* (2013.01); *B01J 35/1038* (2013.01); *B01J 37/0201* (2013.01); *B01J 37/0215* (2013.01); *B01J 37/0244* (2013.01); *B01J 37/0246* (2013.01); *B01J 37/0248* (2013.01); *B01J 37/08* (2013.01); *B01J 37/082* (2013.01); *B01J 37/088* (2013.01); *F01N 3/0842* (2013.01); *F01N 3/101* (2013.01); *F01N 3/2839* (2013.01); *B01D 53/945* (2013.01); *B01D 53/9468* (2013.01); *B01D 53/9472* (2013.01); *B01D 2255/1025* (2013.01); *B01D 2255/2065* (2013.01); *B01D 2255/9022* (2013.01); *B01D 2255/9032* (2013.01); *B01D 2255/9155* (2013.01); *B01D 2255/9205* (2013.01); *B01D 2255/9207* (2013.01); *B01D 2257/402* (2013.01); *B01J 35/006* (2013.01); *B01J 35/023* (2013.01); *B01J 2523/00* (2013.01); *Y02C 20/10* (2013.01); *Y02T 10/12* (2013.01)

(58) Field of Classification Search
CPC .............. B01J 37/0201; B01J 37/0207; B01J 37/0215; B01J 37/0248; B01J 37/08; B01J 37/082; B01J 37/088; B01J 37/12; B01J 37/14; B01J 35/1042; F01N 3/0842; F01N 3/101

See application file for complete search history.

(56) References Cited

U.S. PATENT DOCUMENTS

| | | | |
|---|---|---|---|
| 4,497,783 A | 2/1985 | Barber | |
| 4,591,580 A | 5/1986 | Kim et al. | |
| 4,654,319 A | 3/1987 | Kim et al. | |
| 4,714,694 A | 12/1987 | Wan | |
| 4,839,146 A | 6/1989 | Cho | |
| 4,919,902 A | 4/1990 | Bricker | |
| 4,919,903 A | 4/1990 | Gandhi | |
| 5,039,650 A | 8/1991 | Yamada et al. | |
| 5,200,384 A | 4/1993 | Funabiki et al. | |
| 5,376,610 A * | 12/1994 | Takahata | F01N 13/0097 502/66 |
| 5,580,535 A * | 12/1996 | Hoke | B01D 53/864 423/245.3 |
| 5,945,369 A | 8/1999 | Kimura et al. | |
| 5,958,826 A | 9/1999 | Kurokawa et al. | |
| 6,294,140 B1 | 9/2001 | Mussmann | |
| 6,306,794 B1 | 10/2001 | Suzuki et al. | |
| 6,569,392 B1 * | 5/2003 | Li | B01J 23/63 423/213.5 |
| 6,797,668 B2 | 9/2004 | Yoshikawa | |
| 6,893,998 B2 * | 5/2005 | Shigapov | B01J 23/63 502/327 |
| 7,166,263 B2 | 1/2007 | Vanderspurt | |
| 7,341,975 B2 * | 3/2008 | Iwakuni | B01J 23/002 502/326 |
| 7,612,011 B2 | 11/2009 | Vanderspurt | |
| 7,666,375 B2 | 2/2010 | Nakatsuji et al. | |
| 7,799,298 B2 | 9/2010 | Pfeifer et al. | |
| 7,871,957 B2 | 1/2011 | Willigan | |
| 7,977,276 B2 | 7/2011 | Kikuchi et al. | |
| 8,022,010 B2 | 9/2011 | Hilgendorff | |
| 8,207,078 B2 | 6/2012 | Lu et al. | |
| 8,273,681 B2 * | 9/2012 | Naito | B01J 37/0244 502/328 |
| 8,337,791 B2 | 12/2012 | Kohara et al. | |
| 8,491,847 B2 | 7/2013 | Kato et al. | |
| 8,592,337 B2 | 11/2013 | Hilgendorff | |
| 8,617,496 B2 * | 12/2013 | Wei | B01J 37/0248 423/213.2 |
| 8,796,171 B2 | 8/2014 | Fujimura et al. | |
| 8,802,016 B2 | 8/2014 | Grubert | |
| 8,833,064 B2 * | 9/2014 | Galligan | B01J 23/63 60/299 |
| 8,852,519 B2 | 10/2014 | Watanabe et al. | |
| 8,853,120 B2 * | 10/2014 | Aoki | B01J 35/0006 502/303 |
| 9,034,269 B2 | 5/2015 | Hilgendorff | |
| 9,073,043 B2 | 7/2015 | Nagaoka et al. | |
| 9,114,385 B2 | 8/2015 | Brisley | |
| 9,266,092 B2 | 2/2016 | Arnold | |
| 9,540,980 B2 | 1/2017 | Hilgendorff | |
| 9,550,176 B2 * | 1/2017 | Sato | B01J 37/031 |
| 9,610,564 B2 * | 4/2017 | Xue | B01D 53/9481 |
| 9,611,774 B2 * | 4/2017 | Xue | B01J 23/002 |
| 9,687,818 B2 | 6/2017 | Siani | |
| 2003/0186805 A1 | 10/2003 | Vanderspurt | |
| 2008/0120970 A1 | 5/2008 | Hilgendorff | |
| 2012/0027653 A1 | 2/2012 | Da Costa et al. | |
| 2012/0180464 A1 | 7/2012 | Wei et al. | |

FOREIGN PATENT DOCUMENTS

| | | |
|---|---|---|
| JP | H 09271639 | 10/1997 |
| JP | 2010022918 | 2/2010 |
| JP | 2013146726 | 8/2013 |
| KR | 20060019035 | 3/2006 |
| WO | WO 92/05861 | 4/1992 |
| WO | WO 2014/164876 | 10/2014 |

OTHER PUBLICATIONS

Imamura et al., "Decomposition of N2O on Rh-loaded Pr/Ce Composite Oxides", *Applied Catalysis A. General*, 2000, pp. 121-127.

Rico Perez, "Optimization of N2O Decomposition RhOx/ceria Catalysts and Design of High N2-Selective deNOX System for Diesel Vehicles," Ph.D. Thesis. *Univesidad de Alicante*, 2013, Retrieved from the Internet: http://tua.ua.es/dspace/handle/10045/35739?locale=en.

Yang, "New Development of the Study on Catalytic Decomposition N2O Catalyst," *Environmental Engineering*, 2012, p. 114-119, vol. 30, No. 19.

* cited by examiner

Gasoline TWC Systems

GDI Systems

NITROUS OXIDE REMOVAL CATALYSTS FOR EXHAUST SYSTEMS

CROSS-REFERENCE TO RELATED APPLICATIONS

The present application is a divisional of U.S. patent application Ser. No. 15/532,751, filed Jun. 2, 2017, now U.S. Pat. No. 10,634,030, which is a National Phase of PCT/US2015/064484, filed Dec. 8, 2015, which claims priority to U.S. Provisional Patent Application No. 62/088,888, filed Dec. 8, 2014, the disclosures of which are incorporated herein by reference in their entireties.

FIELD OF THE INVENTION

The present invention is directed to a purifying catalyst for exhaust systems of internal combustion engines, and methods for its use. More particularly, the invention pertains to a catalyst comprising a rhodium (Rh) component supported on a ceria-based support, wherein the catalyst is effective to remove nitrous oxide ($N_2O$) under conditions of an exhaust stream of an internal combustion engine. For example, the $N_2O$ removal catalyst is effective to decompose $N_2O$ to nitrogen ($N_2$) and oxygen ($O_2$) and/or to reduce $N_2O$ to nitrogen and water and/or carbon dioxide (depending on the reductant present).

BACKGROUND OF THE INVENTION

Nitrous oxide ($N_2O$) is a greenhouse gas with a global warming potential of 310 times that of $CO_2$ and an atmospheric lifetime of 114 years. Automotive exhaust is one source of $N_2O$ emissions, as a by-product of fuel combustion and as a by-product formed during the catalytic reduction of nitrogen oxides ($NO_x$). $N_2O$ is formed under transient conditions over all major classes of emission control catalysts, including three-way conversion (TWC) catalysts for traditional/stoichiometric gasoline cars and for gasoline direct injection (GDI) gasoline cars, diesel oxidation catalysts (DOCs), catalyzed soot filters (CSFs), lean $NO_x$ traps (LNTs), selective catalytic reduction catalysts (SCRs), which reduce $NO_x$ with urea, and selective ammonia oxidation catalysts (AMOx) catalysts for diesel vehicles.

Recognizing its global warming potential, US EPA has already set a $N_2O$ emission limit of 10 mg/mile for light-duty vehicles over the FTP cycle starting from MY2012, and a $N_2O$ emission limit of 0.1 g/bhp-h for heavy duty vehicles over the heavy duty FTP cycle starting from MY2014. In the past, automobile catalyst systems were optimized for maximum reduction of NOx (a regulated pollutant) without accounting for $N_2O$ level. The more stringent regulations currently on $N_2O$ emissions require that the emission control system design be optimized not only for high NOx conversion performance but also for low $N_2O$ emissions. Under the present standards, if $N_2O$ exceeds the 10 mg/mile limits, there is a penalty against CAFE fuel economy requirements.

It is generally understood that $N_2O$ can be decomposed industrially, e.g., in the context of treating off-gases from nitric acid and adipic acid production. The temperatures for these operations are much higher (>550° C., for example, about 800-900° C.) than the temperature of typical automotive exhaust, and the process streams for these operations contain little water (<1%), unlike typical exhaust gas streams. There are many literature reports describing $N_2O$ decomposition catalysts, and most can be grouped into three categories: (1) supported rhodium (Rh), (2) metal oxides with a spinel structure and (3) ion-exchanged zeolites. Such catalysts are usually in powder or pelleted form. In DE102008048159, decomposition of $N_2O$ in a gas stream is conducted with a catalyst comprising rhodium supported on a gamma-alumina that is optionally doped with cerium (Ce) or gold (Au).

KR20060019035 is directed to a method for removing nitrogen oxides using dual catalyst beds, wherein nitrogen oxides are decomposed into nitrogen and nitrous oxide using a bed of nitrogen oxide-reducing catalyst Pt/$V_x$-$P_y$-(material containing hydroxyl group)z, and the nitrous oxide thus formed is then further decomposed into nitrogen and oxide using a bed of a nitrous oxide-decomposing catalyst comprising Rh and silver (Ag), namely, Rh—Ag/$CeO_2$/M1-M2-M3, where M1 is magnesium (Mg), barium (Ba) or strontium (Sr), M2 is aluminum (Al), iron (Fe), vanadium (V), gallium (Ga) or chromium (Cr), and M3 is zinc (Zn), nickel (Ni), or copper (Cu). There is a continuing need in the art to provide catalytic articles that efficiently and effectively provide removal of nitrous oxide ($N_2O$), particularly under exhaust gas conditions.

SUMMARY OF THE INVENTION

The present disclosure generally provides catalyst compositions and catalyst articles comprising such compositions. In particular, such compositions and articles can comprise catalysts for nitrous oxide ($N_2O$) reduction, e.g., from exhaust gas streams. Theoretically, reduction of $N_2O$ can be achieved by minimizing the formation of $N_2O$ or by using a catalyst to decompose $N_2O$ (e.g., by converting $N_2O$ directly to $N_2$ and $O_2$ and/or by converting $N_2O$ to $N_2$ and $H_2O$ and/or $CO_2$ (depending on the reductant)). Effective $N_2O$ catalyst compositions and articles can be provided as stand-alone materials or components or can be incorporated into existing catalyst systems.

A first aspect of the present disclosure provides a nitrous oxide ($N_2O$) removal catalyst for an exhaust stream of an internal combustion engine, comprising: a $N_2O$ removal catalytic material on a substrate, the catalytic material comprising a rhodium (Rh) component supported on a ceria-based support, wherein the catalytic material has a $H_2$-consumption peak of about 100° C. or less (including 100° C. or less) as measured by hydrogen temperature-programmed reduction ($H_2$-TPR) and is effective to decompose nitrous oxide ($N_2O$) in the exhaust stream to nitrogen ($N_2$) and oxygen ($O_2$) and/or to reduce at least a portion of the $N_2O$ to $N_2$ and water, $N_2$ and carbon dioxide ($CO_2$) or $N_2$, water, and $CO_2$ under conditions of the exhaust stream.

In one embodiment, the $H_2$-consumption peak of aged catalytic material (e.g., after aging at 750° C. for 20 hours with 10 weight % water in air) occurs at a lower temperature than the temperature of the $H_2$-consumption peak of fresh catalytic material. In one or more embodiments, $N_2O$ removal activity of the catalytic material after aging at 750° C. for 20 hours with 10 weight % water is higher than $N_2O$ removal activity of fresh catalytic material. In one or more embodiments, the ceria-based support maintains about 90 to about 100% of its pore volume after aging at 750° C. for 20 hours with 10 weight % water in air.

The ceria-based support may, in some embodiments, comprise about 90 to about 100 weight % $CeO_2$ and have a pore volume that is at least about 0.20 cm$^3$/g. The ceria-based support may comprise a fresh surface area that is in the range of about 40 to about 200 m$^2$/g. The ceria-based support may comprise a surface area that is in the range of about 20 to about 140 m$^2$/g after aging at 750° C. for 20 hours with 10 weight % water in air. The ceria may have an average crystallite size in the range of about 3 to about 20 nm measured by x-ray diffraction (XRD). The ceria-based support may comprise: an x-ray diffraction crystallite size ratio of aged material to fresh material of about 2.5 or less, where aging is 750° C. for 20 hours with 10% $H_2O$ in air.

The ceria-based support may further comprise a promoter comprising yttria, praseodymia, samaria, gadolinia, zirconia, or silica. The ceria-based support may comprise ceria in an amount in the range of about 56 to about 100% by weight of the support on an oxide basis.

The rhodium component may be present on the support in an amount in the range of about 0.01 to about 5% or even about 0.04 to about 3% by weight of the support. The rhodium component may have an average crystallite size of less than about 5 nm. In some embodiments, the rhodium component may have an average crystallite size of about 3 to about 20 nm. The rhodium component may be loaded on the substrate in an amount in the range of about 1 to about 105 g/ft$^3$.

The catalytic material may further comprise an additional metal component. The additional metal component may comprise platinum (Pt), palladium (Pd), silver (Au), copper (Cu), or combinations thereof. The catalytic material may further comprise a metal oxide for promoting the Rh and/or metal component(s). The metal oxide may comprise ceria, praseodymia, yttria, samaria, or gadolinia.

The substrate may comprise a monolithic substrate. Alternatively, the substrate may comprise a wall-flow filter.

Another aspect provides a catalyst composite for an exhaust stream of an internal combustion engine comprising: a $N_2O$ removal catalytic material in a washcoat on a substrate, the catalytic material comprising a rhodium (Rh) component supported on a ceria-based support and is effective to convert nitrous oxide ($N_2O$) under conditions of the exhaust stream, wherein the ceria-based support comprises: about 90 to about 100 weight % $CeO_2$; a pore volume that is in the range of about 0.20 to about 0.40 cm$^3$/g; a fresh surface area that is in the range of about 40 to about 200 m$^2$/g; and an aged surface area that is in the range of about 20 to about 140 m$^2$/g after aging at 750° C. for 20 hours with 10 weight % water in air. The catalytic material may further include a precious metal on a high surface area refractory metal oxide support that is effective to oxidize hydrocarbons and/or carbon monoxide under conditions of the exhaust stream.

Another aspect is an emissions treatment system for treatment of an internal combustion engine exhaust stream including hydrocarbons, carbon monoxide, and nitrogen oxides, the emission treatment system comprising: an exhaust conduit in fluid communication with the internal combustion engine via an exhaust manifold; a treatment catalyst; and any $N_2O$ removal catalyst composite disclosed herein. The treatment catalyst may comprise a nitrogen oxide treatment catalyst, which comprises: a three-way conversion (TWC) catalyst, a lean NOx trap (LNT), or a selective catalytic reduction (SCR) catalyst. The $N_2O$ removal catalyst composite may be located downstream of the nitrogen oxides treatment catalyst. The system may be zoned, wherein the nitrogen oxides treatment catalyst is in a front, upstream zone (i.e., where the gas flow enters) and the $N_2O$ removal catalyst composite is in a back, downstream zone (i.e., where the gas flow exits). The system may be layered and the nitrogen oxides treatment catalyst is in an outer layer and the $N_2O$ removal catalytic material of the catalyst composite is in an inner layer. The system may be layered and the nitrogen oxides treatment catalyst is in an inner layer and the $N_2O$ removal catalytic material of the $N_2O$ catalyst composite is in an outer layer.

In a further aspect, provided is a method for treating exhaust gases comprising contacting a gaseous stream comprising hydrocarbons, carbon monoxide, and nitrogen oxides with any $N_2O$ removal catalyst composite disclosed herein. In an embodiment, $N_2O$ removal activity of the catalytic material after aging at 750° C. for 20 hours with 10 weight % water is higher than $N_2O$ removal activity of fresh catalytic material.

Another aspect provides a method of making a nitrous oxide ($N_2O$) removal catalyst composite, the method comprising: depositing a rhodium precursor onto a fresh ceria-based support having a pore volume that is at least about 0.20 cm$^3$/g and forming a washcoat therefrom; coating a substrate comprising a flow-through monolith or a wall-flow filter with the washcoat to form a coated substrate; and calcining the coated substrate at an elevated temperature. The calcining step may comprise aging, e.g., under conditions of 750° C. for 20 hours with 10 weight % water in air. In some embodiments, the method of making this catalyst composite further comprises a step of calcining the fresh ceria-based support at about 600° C. to about 800° C. before the depositing step.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION OF THE PREFERRED EMBODIMENTS

Figure 1:
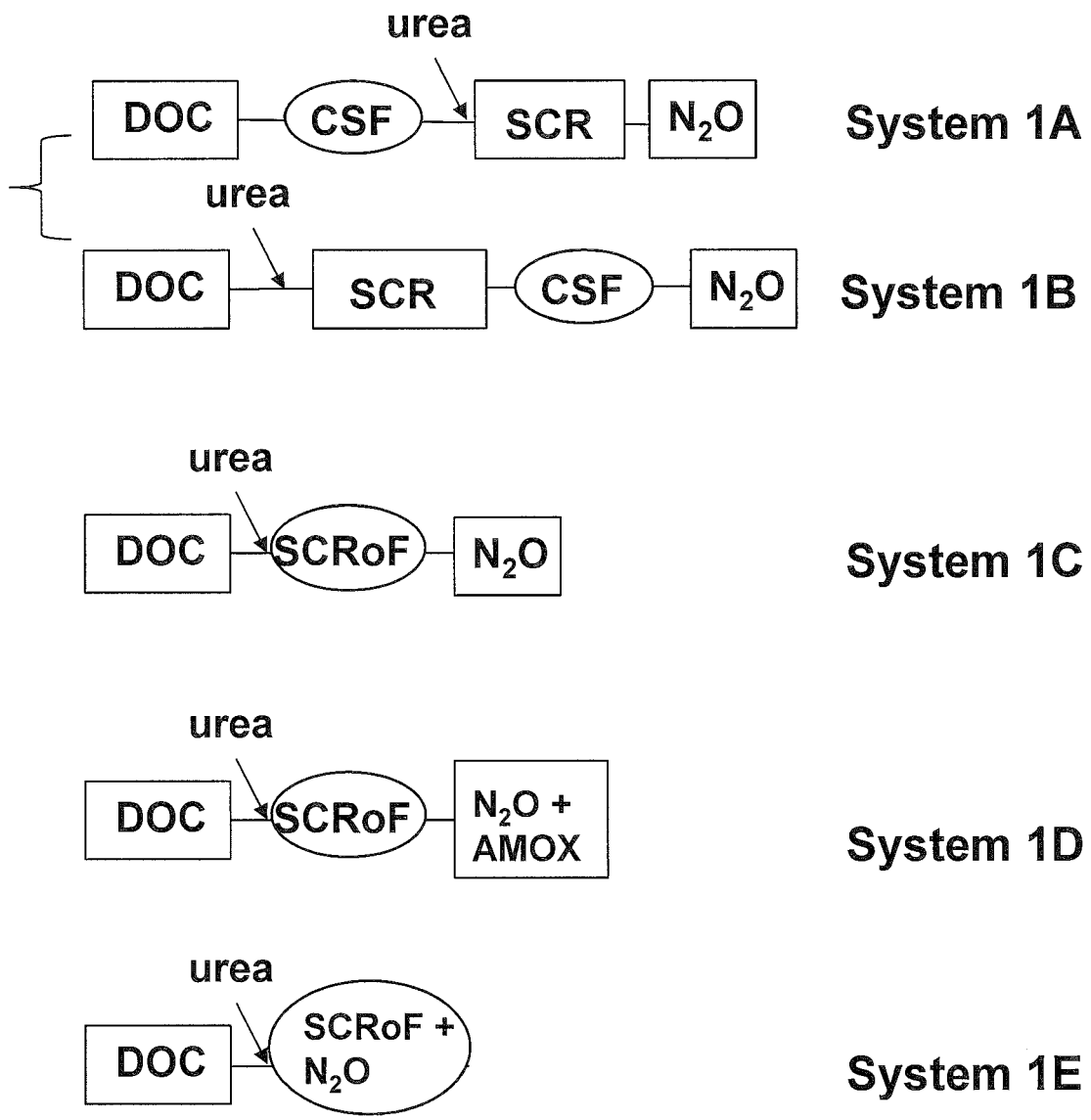
FIG. 1 provides flow diagrams of exemplary diesel SCR exhaust systems including $N_2O$ catalysts.

Before describing several exemplary embodiments of the invention, it is to be understood that the invention is not limited to the details of construction or process steps set forth in the following description. The invention is capable of other embodiments and of being practiced or being carried out in various ways. Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The articles "a" and "an" are used herein to refer to one or to more than one (i.e., to at least one) of the grammatical object of the article. Any ranges cited herein are inclusive. The term "about" used throughout this specification is used to describe and account for small fluctuations. For example, the term "about" can refer to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

Provided are $N_2O$ catalyst compositions comprising one or more rhodium (Rh) components supported on a ceria-based support. In certain embodiments, selection of the ceria-based support may affect the activity of the resulting catalyst composition, as will be described more fully herein. Advantageously, such catalyst compositions are effective in removing at least a portion of the $N_2O$ in various exhaust streams (e.g., mobile source exhaust streams).

The following definitions are used herein.

"$H_2$-TPR" refers to hydrogen temperature-programmed reduction, which is an analytical technique that measures the temperature at which a catalyst consumes $H_2$ under a set of defined conditions. Hydrogen temperature-programmed reduction ($H_2$-TPR) may be carried out on a Micromeritics AutoChem Series Instrument. Prior to the test, a sample is pretreated under a flow of 4% $O_2$ balanced with He at 500° C. for 30 min and then cooled down to ambient temperature. The TPR experiment is then performed by exposing the pretreated sample in 1% $H_2$ balanced with $N_2$ at a gas flow rate of 50 cc/min and the temperature is ramped from 20 to 900° C. at a ramping rate of 10° C./min.

A platinum group metal (PGM) component refers to any compound that includes a PGM (Ru, Rh, Pd, Os, Ir, Pt and/or Au). For example, the PGM may be in metallic form, with zero valance, or the PGM may be in an oxide form. Reference to "PGM component" allows for the presence of the PGM in any valance state. The terms "platinum (Pt) component," "rhodium (Rh) component," "palladium (Pd) component," "iridium (Ir) component," "ruthenium (Ru) component," and the like refers to the respective platinum group metal compound, complex, or the like which, upon calcination or use of the catalyst, decomposes or otherwise converts to a catalytically active form, usually the metal or the metal oxide.

"BET surface area" has its usual meaning of referring to the Brunauer-Emmett-Teller method for determining surface area by $N_2$-adsorption measurements. Unless otherwise stated, "surface area" refers to BET surface area.

"Support" in a catalytic material or catalyst washcoat refers to a material that receives precious metals, stabilizers, promoters, binders, and the like through precipitation, association, dispersion, impregnation, or other suitable methods. Exemplary supports include refractory metal oxide supports as described herein below.

"Refractory metal oxide supports" include bulk alumina, ceria, zirconia, titania, silica, magnesia, neodymia, and other materials known for such use, as well as physical mixtures or chemical combinations thereof, including atomically-doped combinations and including high surface area or activated compounds such as activated alumina. Exemplary combinations of metal oxides include alumina-zirconia, alumina-ceria-zirconia, lanthana-alumina, lanthana-zirconia-alumina, baria-alumina, baria lanthana-alumina, baria lanthana-neodymia alumina, and alumina-ceria. Exemplary aluminas include large pore boehmite, gamma-alumina, and delta/theta alumina. Useful commercial aluminas used as starting materials in exemplary processes include activated aluminas, such as high bulk density gamma-alumina, low or medium bulk density large pore gamma-alumina, and low bulk density large pore boehmite and gamma-alumina, available from BASF Catalysts LLC (Port Allen, La., USA) and Sasol Germany GmbH (Hamburg, Germany). Such materials are generally considered as providing durability to the resulting catalyst.

As used herein, the term "molecular sieves," such as zeolites and other zeolitic framework materials (e.g. isomorphously substituted materials), refers to materials that may, in particulate form, support catalytic precious group metals. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size.

As used herein, the term "zeolite" refers to a specific example of a molecular sieve, further including silicon and aluminum atoms. Zeolites are crystalline materials having rather uniform pore sizes which, depending upon the type of zeolite and the type and amount of cations included in the zeolite lattice, range from about 3 to 10 Angstroms in diameter.

"High surface area refractory metal oxide supports" refer specifically to support particles having pores larger than 20 Å and a wide pore distribution. High surface area refractory metal oxide supports, e.g., alumina support materials, also referred to as "gamma alumina" or "activated alumina," typically exhibit a BET surface area of fresh material in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases.

"Rare earth metal oxides" refer to one or more oxides of scandium, yttrium, and the lanthanum series defined in the Periodic Table of Elements. Rare earth metal oxides can, in some embodiments, be both exemplary oxygen storage components (OSCs) and promotes of oxygen storage. Promoters are metals that enhance activity toward a desired chemical reaction or function. Suitable promoters for oxygen storage include one or more rare earth metals selected from the group consisting of lanthanum, cerium, neodymium, gadolinium, yttrium, praseodymium, samarium, and mixtures thereof.

"Alkaline earth metal oxides" refer to Group II metal oxides, which are exemplary stabilizer materials. Suitable stabilizers include one or more non-reducible metal oxides wherein the metal is selected from the group consisting of barium, calcium, magnesium, strontium and mixtures thereof. Preferably, the stabilizer comprises one or more oxides of barium and/or strontium.

"Washcoat" has its usual meaning in the art of a thin, adherent coating of a material (e.g., a catalyst) applied to a substrate, such as a honeycomb flow-through monolith substrate or a filter substrate which is sufficiently porous to permit the passage therethrough of the gas stream being treated. As used herein and as described in Heck, Ronald and Robert Farrauto, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can have unique chemical catalytic functions.

Reference to "monolithic substrate" means a unitary structure that is homogeneous and continuous from inlet to outlet.

"Selective Catalytic Reduction" (SCR) is the catalytic reduction of nitrogen oxides with a reductant in the presence of an appropriate amount of oxygen with the formation predominantly of nitrogen and steam. Reductants may be, for example, hydrocarbon, hydrogen, and/or ammonia. SCR reactions in the presence of ammonia occur according to the following three reactions:

$$4NO+4NH_3+O_2 \rightarrow 4N_2+6H_2O,$$

$$NO+NO_2+2NH_3 \rightarrow 2N_2+3H_2O,$$

$$6NO_2+8NH_4 \rightarrow 7N_2+12H_2O.$$

"TWC" refers to the function of three-way conversion where hydrocarbons, carbon monoxide, and nitrogen oxides are substantially simultaneously converted. A gasoline engine typically operates under near stoichiometric reaction conditions that oscillate or are pertubated slightly between fuel rich and fuel lean air to fuel ratios (A/F ratios) ($\lambda=1\pm\sim0.01$). Use of "stoichiometric" herein refers to the conditions of a gasoline engine, accounting for the oscillations or perturbations of A/F ratios near stoichiometric. TWC catalysts include oxygen storage components (OSCs) such as ceria that have multi-valent states which allows oxygen to be held and released under varying air to fuel ratios. Under rich conditions when NOx is being reduced, the OSC provides a small amount of oxygen to consume unreacted CO and HC. Likewise, under lean conditions when CO and HC are being oxidized, the OSC reacts with excess oxygen and/or NOx. As a result, even in the presence of an atmosphere that oscillates between fuel rich and fuel lean air to fuel ratios, there is conversion of HC, CO, and NOx all at the same (or at essentially all the same) time.

Typically, a TWC catalyst comprises one or more platinum group metals such as palladium and/or rhodium and optionally platinum; an oxygen storage component; and optionally promoters and/or stabilizers. Under rich conditions, TWC catalysts can generate ammonia.

"OSC" refers to an oxygen storage component, which is an entity that has multi-valent oxidation states and can actively react with oxidants such as oxygen ($O_2$) or nitric oxides ($NO_2$) under oxidative conditions, or reacts with reductants such as carbon monoxide (CO), hydrocarbons (HC), or hydrogen ($H_2$) under reduction conditions. Examples of suitable oxygen storage components include ceria. Praseodymia can also be included as an OSC. Delivery of an OSC to the washcoat layer can be achieved by the use of, for example, mixed oxides. For example, ceria can be delivered as a mixed oxide of cerium and zirconium, and/or a mixed oxide of cerium, zirconium, and neodymium. For example, praseodymia can be delivered as a mixed oxide of praseodymium and zirconium, and/or a mixed oxide of praseodymium, cerium, lanthanum, yttrium, zirconium, and neodymium.

"DOC" refers to a diesel oxidation catalyst, which converts hydrocarbons and carbon monoxide in the exhaust gas of a diesel engine. Typically, a DOC comprises one or more platinum group metals such as palladium and/or platinum; a support material such as alumina; zeolites for HC storage; and optionally promoters and/or stabilizers.

"LNT" refers to a lean-NOx trap, which is a catalyst containing a platinum group metal, ceria, and an alkaline earth trap material suitable to adsorb NOx during lean conditions (for example, BaO or MgO). Under rich conditions, NOx is released and reduced to nitrogen.

"CSF" refers to a catalyzed soot filter, which is a wall-flow monolith having an oxidation catalyst suitable to collect soot particles at low temperature and to burn soot during regeneration conditions.

"GDI" refers to a gasoline direct injection gasoline engine, which operates under lean burn conditions.

"AMOx" refers to a selective ammonia oxidation catalyst, which is a catalyst containing one or more metals (typically Pt, although not limited thereto) and an SCR catalyst suitable to convert ammonia to nitrogen.

Catalyst Compositions

As noted above, the catalyst compositions generally disclosed herein comprise a Rh component on a ceria-based support (e.g., impregnated on a ceria based support). By "ceria-based support" is meant a material (e.g., a refractory metal oxide support material) comprising at least about 50% by weight ceria. In certain embodiments, the ceria-based support comprises at least about 55 wt. %, at least about 60 wt. %, at least about 65 wt. %, at least about 70 wt. %, at least about 75 wt. %, at least about 80 wt. %, at least about 85 wt. %, at least about 90 wt. %, at least about 91 wt. %, at least about 92 wt. %, at least about 92 wt. %, at least about 93 wt. %, at least about 94 wt. %, at least about 95 wt. %, at least about 96 wt. %, at least about 97 wt. %, at least about 98 wt. %, at least about 99 wt. %, or even at least about 99.9 wt. % ceria (based on the entire weight of the ceria-based support). In some embodiments, the ceria-based support may comprise, in addition to ceria, various metal oxides (resulting in a mixed metal oxide composite support). Exemplary metal oxides that may be included in the ceria-based support include zirconia, lanthana, yttria, praseodymia, neodymia, samaria, gadolinia, or other rare earth metal oxides.

Advantageously, in certain embodiments, the ceria-based support is at least about 90% by weight ceria or at least about 95% by weight ceria, and in some embodiments, about 100% by weight ceria. In some embodiments, the ceria-based support can be described as consisting of ceria or consisting essentially of ceria. The ceria-based support can, in some embodiments, be described as being substantially free of other metal oxides. Ceria-based supports can, in some embodiments, be described as being highly stable. By "highly stable" in this context is meant that the decrease in BET surface area is less than about 60% and the decrease in pore volume is less than about 10% after the material is calcined at 750° C. for 20 hours with 10% water/steam in air.

Preparation of $N_2O$ Catalyst Compositions $N_2O$ catalyst compositions comprising a rhodium component and a ceria-based support according to the present disclosure are commonly provided in the form of a washcoat, and such washcoats may be made by various techniques. The preparation of the catalyst composition generally comprises impregnating the ceria-based support in particulate form with a solution comprising a rhodium reagent. For the purposes herein, the term "rhodium reagent" means any rhodium-containing compound, salt, complex, or the like which, upon calcination or use thereof, decomposes or otherwise converts to a catalytically active form (i.e., rhodium component), usually the metal or the metal oxide (i.e., rhodium or rhodium oxide).

As referenced herein above, selection of the (fresh) ceria-based support upon which the rhodium reagent is impregnated may affect the activity of the catalyst compositions produced according to the present disclosure. In some embodiments, analysis of a given fresh ceria-based support is useful in predicting the activity of a catalyst composition according to the present disclosure. See Example 2, below, for various physical and chemical characterization methods that can be employed for this purpose. Relevant considerations can include, but are not limited to, pore volumes, surface areas (e.g., BET surface areas), average pore radius, and x-ray diffraction patterns of the fresh ceria-based support. Pore volumes of certain preferred fresh ceria-based supports are usually at least about 0.20 cm³/g. In certain embodiments, the pore volume of the fresh ceria-based supports is in the range of about 0.20 to 0.40 cm³/g. Surface areas of certain preferred fresh ceria supports are generally at least about 40 m²/g and in some embodiments, may be at least about 60 m²/g, at least about 80 m²/g, or at least about 100 m²/g. In certain embodiments, surface areas of the fresh ceria-based supports are in the range of about 40 to about 200 m²/g, and in some embodiments, in the range of about 100 to about 180 m²/g.

Although not intending to be limited by theory, it is believed that particular ceria-based supports are more effective at absorbing $O_2$. It is generally understood that catalytic decomposition of $N_2O$ consists of the following steps (Equations 1 to 4), where □ is a catalytically active site

 (1)

 (2)

 (3)

 (4)

A $N_2O$ molecule contacts with an active site and adsorbs thereon (Reaction 1). The adsorbed $N_2O$ is then dissociated to $N_2$ and an adsorbed O atom (Reaction 2). Two adsorbed O atoms can combine to form an $O_2$ molecule, restoring the open active sites (Reaction 3). Alternatively, a $N_2O$ molecule can react with an adsorbed O atom, producing $O_2$ and $N_2$ (Reaction 4). On a metal surface, Reaction 2 can readily take place at room temperature. However, the $O_2$ formation step (Reaction 3) is more difficult because of strong O-metal bonding and requires high temperatures (typically >600° C.). As the metal surface is being oxidized by the decomposition product (oxygen), the decomposition reaction slows down and eventually stops. Therefore, the rate determining step for a metal catalyst is usually the oxygen formation step. Under oxidizing conditions, most metals are not stable and converted to oxides. On an oxide catalyst, the $N_2O$ decomposition step (Reaction 2) becomes critical too. Although not intending to be limited by theory, it is believed that the surprising activity of the $Rh/CeO_2$ catalyst may be attributed to its ability to decompose $N_2O$ and to form $O_2$. The active state of Rh is Rh oxide as detected by X-ray photoelectron spectroscopy. It is speculated that the O atoms, formed as result of $N_2O$ decomposition, can be channeled away from the Rh sites to the $CeO_2$ support, where they combine to form $O_2$. The special capability of the $CeO_2$ in promoting oxygen mobility is believed to be a key for sustained $N_2O$ decomposition activity.

In general terms, the rhodium reagent (e.g., in the form of a rhodium salt solution) can be impregnated onto a ceria-based support (e.g., powder) by, for example, incipient wetness techniques. Water-soluble rhodium compounds or salts or water-dispersible compounds or complexes of the metal component may be used as long as the liquid medium used to impregnate or deposit the metal component onto the support particles does not adversely react with the metal or its compound or its complex or other components which may be present in the catalyst composition and is capable of being removed from the Rh reagent/Rh component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds, salts, or complexes of rhodium are advantageously utilized as Rh reagents.

The impregnated powder is then slurried in deionized water to form a washcoat. Additional process steps may be applied to either the impregnated powder or the slurry prior to coating the washcoat onto a substrate. In some embodiments, desired additional ingredients such as other platinum group metals, stabilizers, and/or promoters can be added to the slurry.

In one or more embodiments, the slurry is acidic, having a pH of about 2 to less than about 7. The pH of the slurry may be lowered by the addition of an adequate amount of an inorganic or an organic acid to the slurry. Combinations of both an inorganic acid and an organic acid can be used in some embodiments, particularly when compatibility of acid and raw materials is considered. Inorganic acids include, but are not limited to, nitric acid. Organic acids include, but are not limited to, acetic acid, propionic acid, oxalic acid, malonic acid, succinic acid glutamic acid, adipic acid, maleic acid, fumaric acid, phthalic acid, tartaric acid, citric acid and the like and combinations thereof. Thereafter, if desired, water-soluble or water-dispersible compounds of a stabilizer, e.g., barium acetate, and/or a promoter, e.g., lanthanum nitrate, may be added to the slurry.

In some embodiments, the slurry may thereafter be comminuted to result in substantially all of the solids having particle sizes of less than a given size, e.g., less than about 20 microns average diameter, such as between about 0.1-15 microns average diameter (for example, for coating onto a substrate/carrier that is a flow-through monolith). The optional comminution may be accomplished in a ball mill or other similar equipment, and the solids content of the slurry may be, e.g., about 10-50 wt. %, more particularly about 10-40 wt. % for coating onto a flow-through monolith. In some embodiments, the slurry may be comminuted to result in substantially all of the solids having particle sizes of less than about 10 microns average diameter, such as between about 2-3 microns average diameter (for example, for coating onto a substrate/carrier that is a wall flow monolith). The optional comminution may be accomplished in a ball mill or other similar equipment, and the solids content of the slurry may be, e.g., about 10-50 wt. %, more particularly about 10-40 wt. % for coating onto a flow-through monolith and, e.g., about 5-30 wt. %, more particularly about 10-20 wt. % for coating onto a wall flow monolith. Thereafter the Rh-impregnated ceria-based support is generally calcined. An exemplary calcination process involves heat treatment in air at a temperature of about 400 to about 800° C. for about 10 minutes to about 3 hours. During the calcination step, or at least during the initial phase of use of the catalytic composition, the Rh reagent is converted into a catalytically active form of the metal or a compound thereof. The above process can be repeated as needed to reach the desired level of Rh impregnation. The resulting material can be stored as a dry powder or in slurry form.

Substrate

According to one or more embodiments, the substrate for the $N_2O$ catalyst composition disclosed herein may be constructed of any material typically used for preparing automotive catalysts and will typically comprise a metal or ceramic honeycomb structure. The substrate typically provides a plurality of wall surfaces upon which a washcoat comprising the $N_2O$ catalyst composition is applied and adhered, thereby acting as a carrier for the catalyst composition. The catalytic material is typically disposed on a substrate such as a monolithic substrate for exhaust gas applications.

Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). A dual oxidation catalyst composition can be coated on the wall-flow filter. If such a substrate is utilized, the resulting system will be able to remove particulate matters along with gaseous pollutants. The wall-flow filter substrate can be made from materials commonly known in the art, such as cordierite or silicon carbide.

The substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

The substrates useful for the catalysts of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface of the metal substrates may be oxidized at high temperatures, e.g., 1000° C. and higher, to improve the resistance to corrosion of the alloys by forming an oxide layer on the surfaces of the substrates/carriers. Such high temperature-induced oxidation may enhance the adherence of the refractory metal oxide support and catalytically promoting metal components to the substrate.

In alternative embodiments, one or more catalyst compositions may be deposited on an open cell foam substrate. Such substrates are well known in the art, and are typically formed of refractory ceramic or metallic materials.

Coating the Substrate

The above-noted catalyst composition, in the form of ceria-based support particles impregnated with a Rh reagent/component, is mixed with water to form a slurry for purposes of coating a catalyst substrate, such as the types of substrate described herein above. In addition to the catalyst particles, the slurry may optionally contain alumina as a binder, hydrocarbon (HC) storage components (e.g., zeolite), water-soluble or water-dispersible stabilizers (e.g., barium acetate), promoters (e.g., lanthanum nitrate), associative thickeners, and/or surfactants (including anionic, cationic, non-ionic or amphoteric surfactants).

The slurry can be milled to enhance mixing of the particles and formation of a homogenous material. The milling can be accomplished in a ball mill, continuous mill, or other similar equipment to ensure solids contents, e.g., within the ranges noted above with respect to coating various types of substrates. The slurry is then coated on the catalyst substrate using a washcoat technique known in the art. As used herein, the term "washcoat" has its usual meaning in the art of a thin, adherent coating of a catalytic material applied to a substrate. In one embodiment, the catalyst substrate is dipped one or more times in the slurry or otherwise coated with the slurry. In some embodiments, the catalyst slurry is applied to the substrate such that a desired loading of the washcoat is deposited, e.g., about 0.5 to about 3.0 $g/in^3$.

Thereafter, the coated substrate is dried at an elevated temperature (e.g., about 100 to about 150° C.) for a period of time (e.g., about 1 to about 3 hours) and then calcined by heating, e.g., at about 400 to about 600° C., typically for about 10 minutes to about 3 hours. Following drying and calcining, the final washcoat coating layer can generally be viewed as essentially solvent-free.

After calcining, the catalyst loading can be determined through calculation of the difference in coated and uncoated weights of the substrate. As will be apparent to those of skill in the art, the catalyst loading can be modified by altering the slurry rheology. In addition, the coating/drying/calcining process can be repeated as needed to build the coating on the substrate to the desired loading level or thickness. The catalyst composition can be applied as a single layer or in multiple layers to the substrate.

In certain embodiments, the coated substrate is aged, by subjecting the coated substrate to heat treatment, e.g., at 750° C., 10 wt. % water in air, 20 hours aging. Aged catalyst articles are thus provided in certain embodiments. In certain embodiments, particularly effective materials comprise ceria-based supports (including, but not limited to substantially 100% ceria supports) that maintain a high percentage (e.g., about 95-100%) of their pore volumes upon aging (e.g., at 750° C., 10 wt. % water in air, 20 hours aging). Accordingly, pore volumes of aged ceria-based supports can be, in some embodiments, at least about 0.18 cm$^3$/g, at least about 0.19 cm$^3$/g, or at least about 0.20 cm$^3$/g, e.g., about 0.18 cm$^3$/g to about 0.40 cm$^3$/g.

The surface areas of aged ceria supports (e.g., after aging at the above-noted conditions) can be, for example, within the range of about 20 to about 140 m$^2$/g (e.g., based on aging fresh ceria supports having surface areas of about 40 to about 200 m$^2$/g) or about 50 to about 100 m$^2$/g (e.g., based on aging fresh ceria supports having surface areas of about 100 to about 180 m$^2$/g). Accordingly, surface areas of preferred aged ceria-based supports are in the range of about 50 to about 100 m$^2$/g after aging at 750° C. for 20 hours with 10 weight % water in air. In some embodiments, the fresh and aged material can be analyzed by x-ray diffraction, wherein, for example, the average crystallite size ratio of fresh to aged catalyst article can be about 2.5 or less, where aging is at the above-noted conditions.

Catalyst Activity

Catalysts as disclosed herein are effective to decompose at least a portion of the nitrous oxide (N$_2$O) in exhaust gas to nitrogen (N$_2$) and oxygen (O$_2$) and/or to reduce at least a portion of the N$_2$O therein to N$_2$, H$_2$O, and/or CO$_2$ (depending on the reductant) under conditions of exhaust streams of various types of internal combustion engines. By "at least a portion" is meant some percentage of the total N$_2$O in the exhaust gas stream is decomposed and/or reduced. For example, in some embodiments, at least about 1%, at least about 2%, at least about 5%, at least about 10%, at least about 20%, at least about 30%, at least about 40%, at least about 50%, at least about 60%, at least about 70%, at least about 80%, or at least about 90% by weight of the nitrous oxide in the gas stream is decomposed and/or reduced under such conditions. Note that activity is dependent on reaction temperature.

For example, under lean conditions, such as those found in exhaust streams of diesel engines operating with a SCR catalyst, a N$_2$O catalyst as described herein can decompose N$_2$O present in the exhaust stream. Under oscillating conditions, such as those found in exhaust streams of diesel and/or gasoline direct injection (GDI) engines operating with an LNT or a TWC, a N$_2$O catalyst as described herein can reduce N$_2$O formation.

The conversion chemistries follow the following reactions:
Decomposition:

$$2N_2O \rightarrow 2N_2 + O_2 \qquad (I)$$

Reduction:

$$N_2O + H_2 \rightarrow N_2 + H_2O \qquad (IIa)$$

$$N_2O + HC \rightarrow N_2 + CO_2 + H_2O \qquad (IIb)$$

$$N_2O + CO \rightarrow N_2 + CO_2 \qquad (IIc)$$

$$3N_2O + 2NH_3 \rightarrow 4N_2 + 3H_2O \qquad (IId).$$

It is generally understood that the N$_2$O conversion activity of a catalyst is related to its reducibility, i.e. the ability to lose oxygen. One measure of reducibility is H$_2$-TPR, hydrogen temperature-programmed reduction, which measures the temperature at which the catalyst consumes H$_2$ under a set of defined conditions. The lower the temperature of the H$_2$-consumption peak, the more readily reducible the catalyst and the more active it is. In one or more embodiments, the catalyst demonstrates a H$_2$-peak of 100° C. or less under fresh and/or aged conditions.

The disclosed rhodium-containing catalysts, comprising a highly stable ceria-based support, (for example, a support whose majority content is ceria), can provide a highly active catalyst for decomposing N$_2$O at relatively low temperatures, such as those of engine exhaust (for example, about 300 to 500° C.). The ceria-based supports used herein are highly compatible with rhodium. It is believed that the interaction (and, in some embodiments, possible synergy) between rhodium and the ceria-based supports increases the mobility of oxygen in the catalyst and therefore promotes the catalytic activity for N$_2$O decomposition. It was unexpectedly found that this promotion effect was much more pronounced after a thermal treatment (i.e., aging) of the Rh catalyst at high temperatures, for example, 600° C. to about 800° C., such as around 750° C. for at least 10 hours (e.g., about 10 to about 30 hours, e.g., about 20 hours) or by pre-calcining the ceria-containing support before Rh impregnation at high temperatures, e.g., 600° C. to about 800° C., such as around 700° C. for at least 1 hour (e.g., about 1 to about 5 hours, about 1 to about 3 hours, or about 2 hours). This finding is surprising, as it is in clear contrast to other catalyst compositions, where high temperature aging has a detrimental effect on their catalyst activities (generally due to catalyst sintering under such conditions).

Emission Treatment System

The present invention also provides an emission treatment system that incorporates the N$_2$O conversion catalyst composition or article described herein. The N$_2$O conversion catalyst composition of the present invention is typically used in an integrated emissions treatment system comprising one or more additional components for the treatment of diesel exhaust gas emissions. As such, the terms "exhaust stream", "engine exhaust stream", "exhaust gas stream" and the like refer to engine effluent as well as to the effluent downstream of one or more other catalyst system components as described herein.

N$_2$O catalyst compositions and articles as disclosed herein may be incorporated in various ways within an exhaust gas stream system. The N$_2$O catalyst compositions disclosed herein may be provided in in some embodiments, in the form of a catalytic article comprising the N$_2$O catalyst, substantially free of other catalytic material. In other embodiments, the N₂O catalyst compositions can be provided on an article with other catalytic materials (e.g., giving a catalytic article comprising two or more catalytic compositions). As such, the N₂O removal catalysts may be used independently or in conjunction with other catalytically active materials in any combination (including but not limited to, configurations such as a homogeneous mixture, a zoned structure, and/or a layered structure). For example, the N₂O catalyst (i.e., a rhodium component on a ceria-based support) may be used in conjunction with another precious metal (e.g., Pt and/or Pd) on a high surface area refractory metal oxide support (e.g., γ-Al₂O₃) that is effective to oxidize hydrocarbons and/or carbon monoxide under conditions of the exhaust stream. Such an overall combination of catalytic materials may in turn be used to formulate an AMOx catalyst, an LNT catalyst, and/or a TWC catalyst with the optional addition of further components such as other precious metals, supports, stabilizers, promoters, binders, and the like. Additional functional catalytic layers may be prepared and deposited upon previous layers in the same manner as described above for deposition of any layer upon the support.

N₂O catalyst compositions and/or articles are generally employed in combination with one or more other components (e.g., other catalysts, as will be described in greater detail below). The N₂O catalyst can be positioned upstream or downstream from such other components. "Downstream" refers to a position of a component in an exhaust gas stream in a path further away from the engine than the preceding component. For example, when a diesel particulate filter is referred to as downstream from a diesel oxidation catalyst, exhaust gas emanating from the engine in an exhaust conduit flows through the diesel oxidation catalyst before flowing through the diesel particulate filter. Thus, "upstream" refers to a component that is located closer to the engine relative to another component. In all flow diagrams referenced herein, the gas flow is understood to be from left to right such that, for example, in FIGS. 1-4, the N₂O catalyst (shown as "N₂O") is generally downstream of the other components shown in the illustrated systems, although the invention is not intended to be limited thereto.

For example, within a diesel exhaust gas stream system, an N₂O catalyst is generally positioned downstream of a diesel oxidation catalyst (DOC). Turning to the figures, FIG. 1 provides flow diagrams of exemplary diesel SCR exhaust systems including N₂O catalysts. System 1A depicts a DOC followed by a catalyzed soot filter (CSF) followed by a urea feed for a selective catalytic reduction (SCR) catalyst, followed by a N₂O catalyst. System 1B depicts a DOC followed by a urea injector and an SCR catalyst, followed by a CSF and a N₂O catalyst. System 1C depicts a DOC followed by a urea injector a SCR catalyst on a filter (SCRoF) followed by a N₂O catalyst. System 1D depicts a DOC followed by a urea injector a SCR catalyst on a filter (SCRoF) followed by a combination N₂O catalyst and ammonia oxidation (AMOx) catalyst. System lE depicts a DOC followed by a urea injector and a combination filter design with both SCR catalyst on a filter (SCRoF) and N₂O catalyst.

Figure 2:
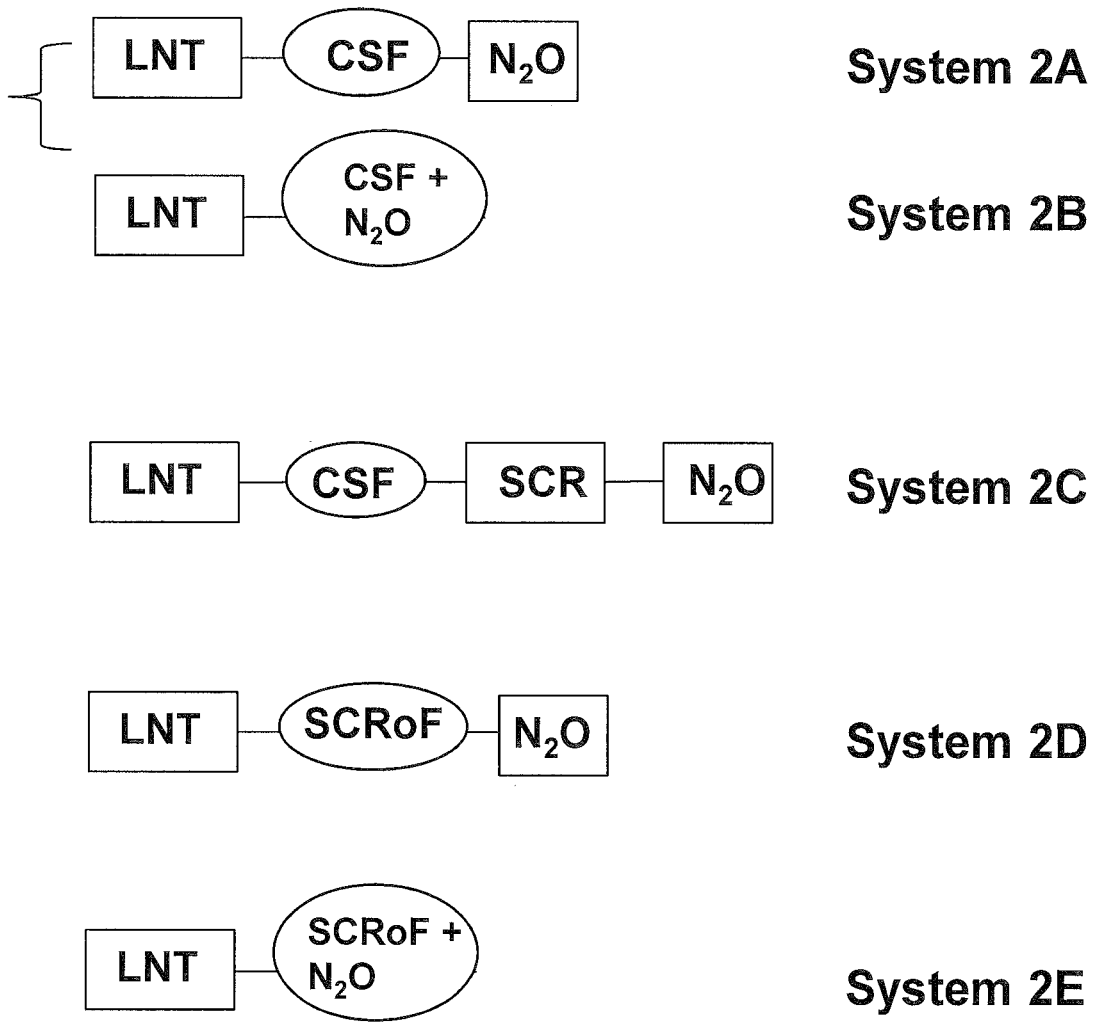
FIG. 2 provides flow diagrams of exemplary diesel LNT exhaust systems including $N_2O$ catalysts.

FIG. 2 provides flow diagrams of exemplary diesel LNT exhaust systems including N₂O catalysts. System 2A depicts a lean NOx trap (LNT) followed by a CSF followed by a N₂O catalyst. System 2B depicts a LNT followed by a N₂O catalyst on a catalyzed soot filter (CSF+N₂O). System 2C depicts a LNT followed by a CSF, followed by a SCR catalyst, followed by a N₂O catalyst. System 2D depicts a LNT followed by a SCR catalyst on a filter (SCRoF) followed by a N₂O catalyst. System 2E depicts a LNT followed by a N₂O catalyst on a SCRoF.

Figure 3:
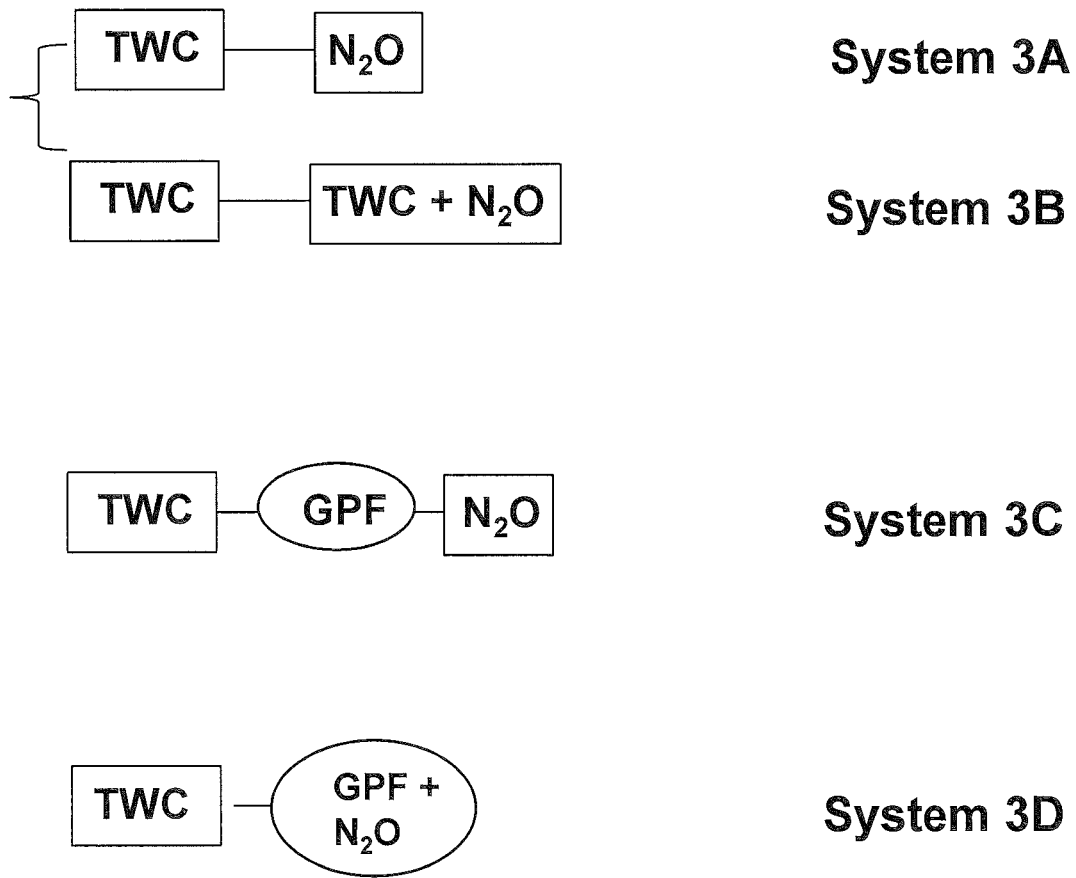
FIG. 3 provides flow diagrams of exemplary gasoline TWC exhaust systems including $N_2O$ catalysts.

FIG. 3 provides flow diagrams of exemplary gasoline TWC exhaust systems including N₂O catalysts. System 3A depicts a three-way conversion (TWC) catalyst followed by a N₂O catalyst. System 3B depicts a TWC catalyst followed by another catalyst in which the second/rear TWC also contains a N₂O catalyst. System 3C depicts a TWC followed by a gasoline particulate filter (GPF) followed by an N₂O catalyst. System 3D depicts a TWC followed by a N₂O catalyst on a gasoline particulate filter (GPF+N₂O).

Figure 4:
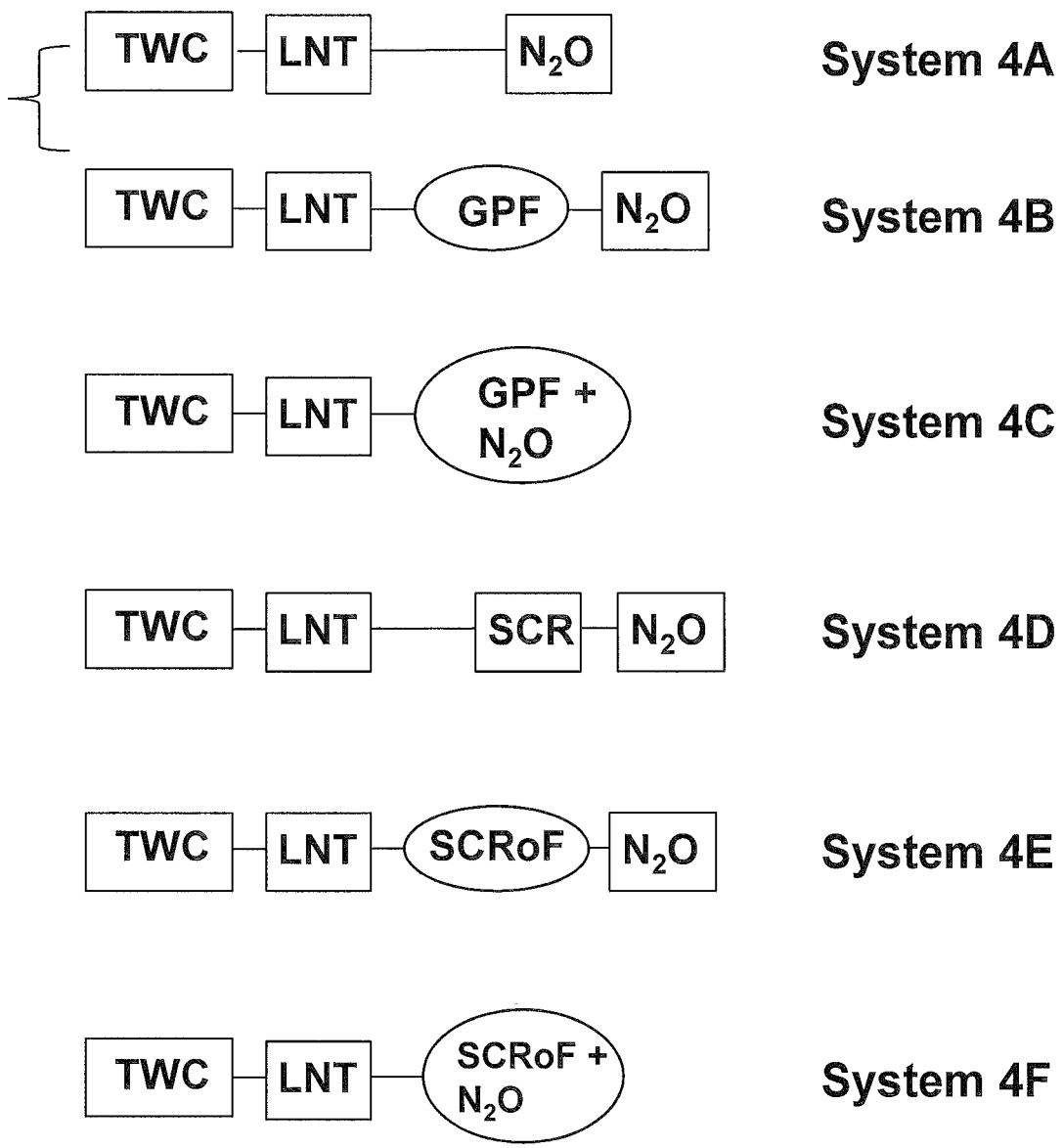
FIG. 4 provides flow diagrams of exemplary GDI exhaust systems including $N_2O$ catalysts.

FIG. 4 provides flow diagrams of exemplary GDI exhaust systems including N₂O catalysts. System 4A depicts a three-way conversion (TWC) catalyst followed by a LNT followed by a N₂O catalyst. System 4B depicts a TWC followed by a LNT followed by a gasoline particulate filter (GPF), followed by a N₂O catalyst. System 4C depicts a TWC followed by a LNT, followed by a N₂O catalyst on a gasoline particulate filter (GPF+N₂O). System 4D depicts a TWC followed by a LNT followed by a SCR catalyst followed by a N₂O catalyst. System 4E depicts a TWC followed by a LNT followed by a SCRoF, followed by a N₂O catalyst. System 4F depicts a TWC followed by a LNT, followed by a N₂O catalyst on a SCRoF.

Figure 5:
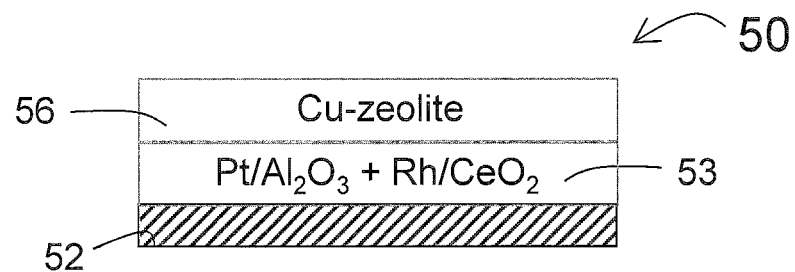
FIG. 5 depicts an exemplary layered composite of SCR/AMOx catalyst and a $N_2O$ catalyst.

FIG. 5 depicts an exemplary layered composite 50 of an SCR/AMOx catalyst and a N₂O catalyst according to the present disclosure where a top layer 56 comprises a Cu-zeolite catalyst for SCR and a bottom layer 53 comprises a homogeneous mixture of platinum on alumina (Pt/Al₂O₃) for AMOx in combination with the rhodium on ceria (Rh/CeO₂) N₂O catalyst located on a flow-through carrier/substrate 52.

Figure 6:
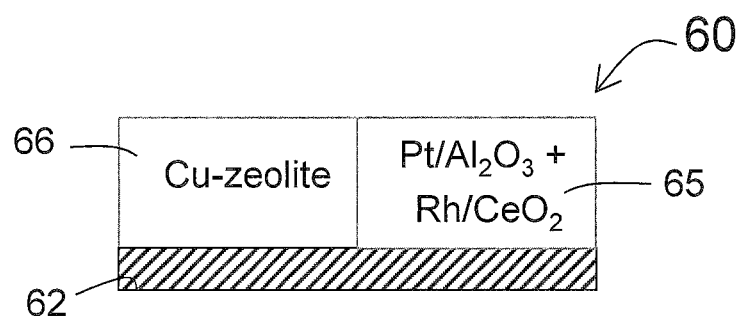
FIG. 6 depicts an exemplary zoned composite of a SCR/AMOx catalyst and a $N_2O$ catalyst.

FIG. 6 depicts an exemplary zoned composite 60 of a SCR/AMOx catalyst and a N₂O catalyst where a front zone 66 comprises a Cu-zeolite catalyst for SCR on the flow-through carrier/substrate 62, and a rear zone 65 comprises a homogeneous mixture of platinum on alumina (Pt/Al₂O₃) for AMOx in combination with the rhodium on ceria (Rh/CeO₂) N₂O catalyst.

FIGS. 7A-7D depict exemplary layered and zoned composites of the SCR/AMOx+N₂O catalyst.

Figure 7A:
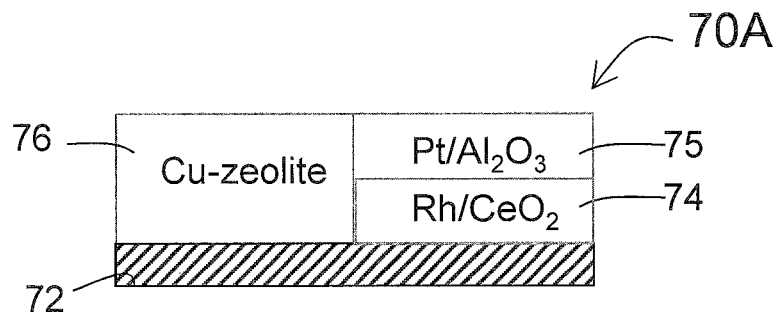
FIGS. 7A-7D depict exemplary layered and zoned composites of an AMOx catalyst and a $N_2O$ catalyst.
Figure 7B:
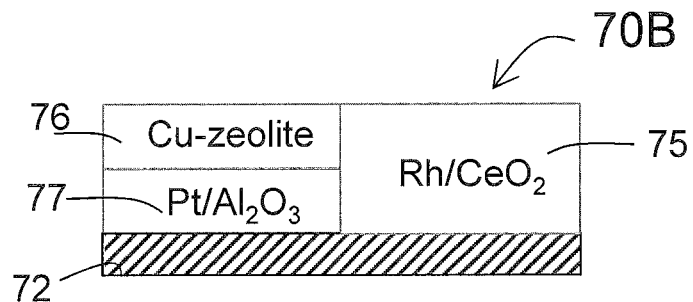
Figure 7C:
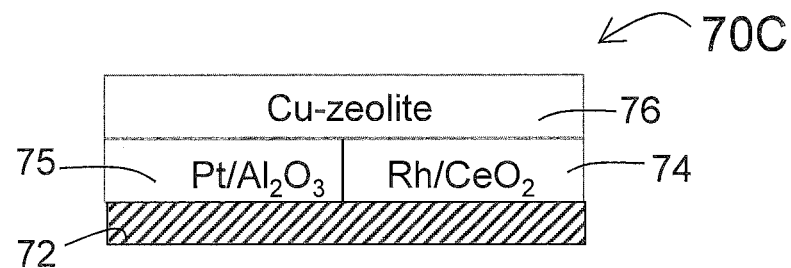
Figure 7D:
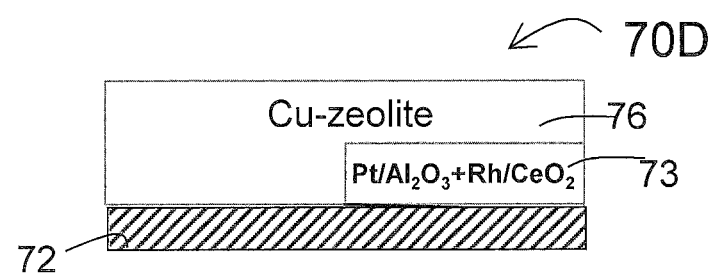

In FIG. 7A, composite 70A comprises a flow-through carrier/substrate 72 on which is deposited: a front zone 76 comprising a Cu-zeolite catalyst for SCR and a layered rear zone having a bottom layer 74 comprising a Rh/CeO₂ N₂O catalyst and a top layer comprising a Pt/Al₂O₃ AMOx catalyst. In FIG. 7B, composite 70B comprises a flow-through carrier/substrate 72 on which is deposited: a top layer 76 of a front zone comprising a Cu-zeolite catalyst for SCR and a bottom layer 77 of the front zone comprising a Pt/Al₂O₃ AMOx catalyst and a rear zone 75 comprising a Rh/CeO₂ N₂O catalyst. In FIG. 7C, composite 70C comprises a flow-through carrier/substrate 72 on which is deposited: a top layer 76 comprising a Cu-zeolite catalyst for SCR and a bottom layer having a front zone 75 comprising a Pt/Al₂O₃ AMOx catalyst and a rear zone 74 comprising a Rh/CeO₂ N₂O catalyst. In FIG. 7D, composite 70D comprises a flow-through carrier/substrate 72 on which is deposited: a top layer and front zone 76 comprising a Cu-zeolite catalyst for SCR and a rear zoned bottom layer 73 comprising a homogeneous mixture of the Pt/Al₂O₃ AMOx catalyst in combination with the Rh/CeO₂N₂O catalyst.

Figure 8:
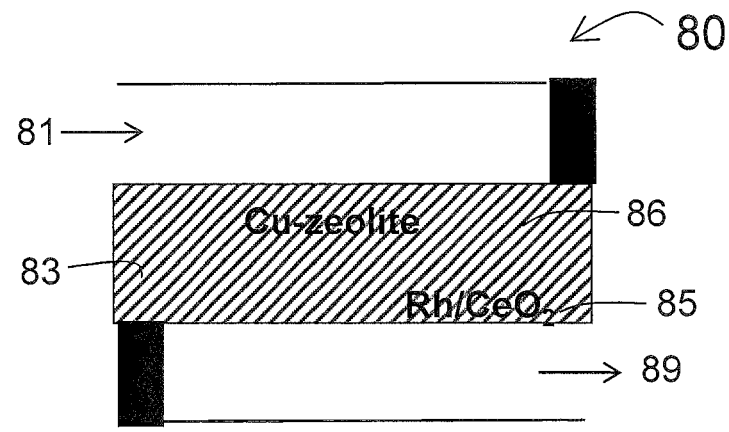
FIG. 8 depicts an exemplary SCR catalyst with $N_2O$ catalyst on a wall-flow filter.

FIG. 8 depicts an exemplary SCRoF with N₂O function composite 80, where an upstream side 81 of a wall-flow filter 83 comprises a layer 86 on and/or in the filter walls comprising a Cu-zeolite which is an SCR catalyst, and a downstream side 89 of the filter 83 comprises a zone of $N_2O$ catalyst 85. It is expected that a urea feed would supply the SCRoF 80.

Figure 9A:
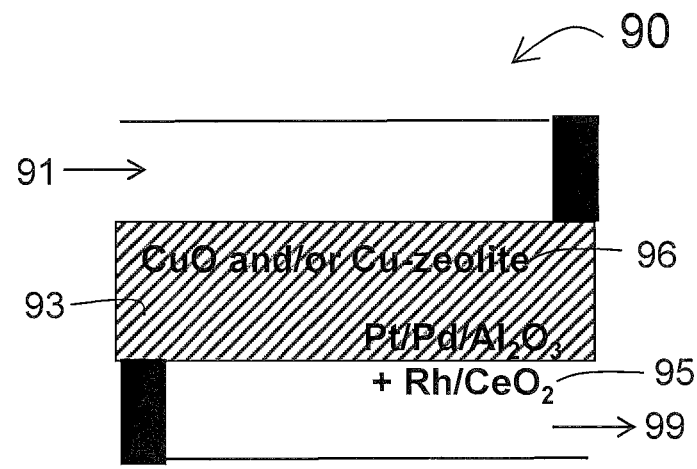
FIGS. 9A-9B depict exemplary wall-flow filters with multifunctional catalytic material including an $N_2O$ catalyst.

FIG. 9A depicts an exemplary composite 90 of a wall-flow filter 93 with $N_2O$ catalyst, where an upstream side 91 of the wall-flow filter 93 comprises a layer 96 comprising Cu—O for hydrogen sulfide ($H_2S$) trapping and/or a Cu-zeolite which provides SCR functionality, and a downstream side 99 of the filter 93 comprises a zone 95 comprising platinum and/or palladium on alumina to provide CO and/or HC oxidation in combination with the $Rh/CeO_2 N_2O$ catalyst.

Figure 9B:
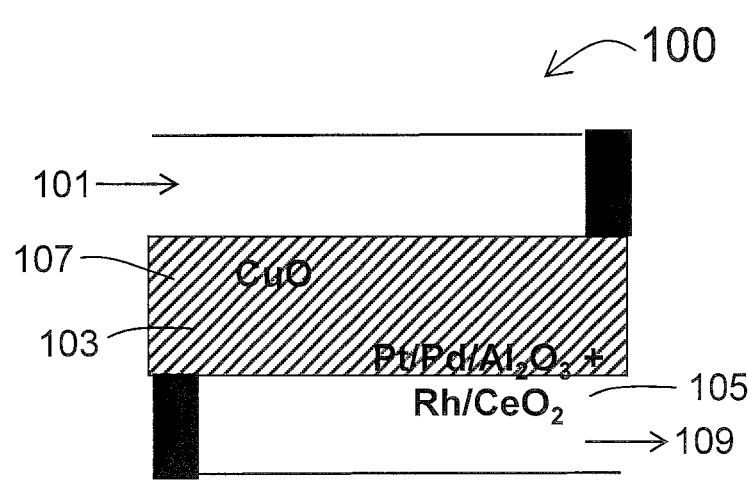

FIG. 9B depicts another exemplary composite 100 of a wall-flow filter 103 with $N_2O$ catalyst, where an upstream side 101 of the wall-flow filter 103 comprises a front zone 107 comprising Cu—O for hydrogen sulfide ($H_2S$) trapping, and a downstream side 109 of the filter 103 comprises a zone 105 that is a homogeneous mixture comprising platinum and/or palladium on alumina to provide CO and/or HC oxidation in combination with the $Rh/CeO_2 N_2O$ catalyst.

Figure 10A:
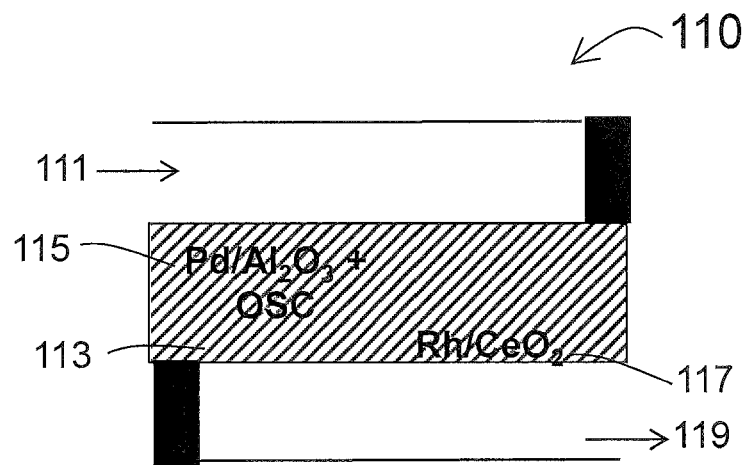
FIGS. 10A-10B depict exemplary gasoline particulate filters having TWC catalyst and $N_2O$ catalyst.

FIG. 10A depicts an exemplary composite 110 of a gasoline particulate filter 113 having a TWC catalyst and a $N_2O$ catalyst 110, where an upstream side 111 of a wall-flow filter suitable for capturing gasoline particulates 113 comprises a front zone 115 comprising a homogeneous mixture of a TWC catalyst comprising palladium on alumina and an oxygen storage component (OSC) such as a ceria-zirconia composite, and a downstream side 119 of the filter 113 comprises a zone 117 comprising the $Rh/CeO_2 N_2O$ catalyst.

Figure 10B:
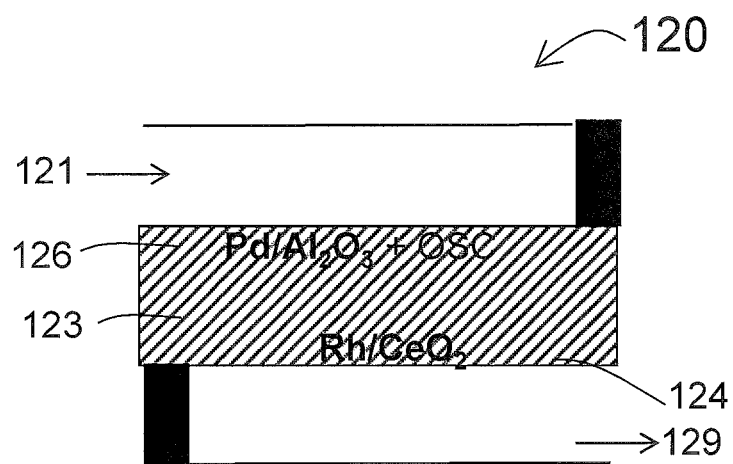

FIG. 10B depicts another exemplary gasoline particulate filter having TWC catalyst and $N_2O$ catalyst 120, where an upstream side 121 of a wall-flow filter suitable for capturing gasoline particulates 123 comprises a layer 126 comprising a homogeneous mixture of a TWC catalyst comprising palladium on alumina and an oxygen storage component (OSC) such as a ceria-zirconia composite, and a downstream side 129 of the filter 123 comprises a layer 124 comprising the $Rh/CeO_2 N_2O$ catalyst.

Before describing several exemplary embodiments of the invention, it is to be understood that the invention is not limited to the details of construction or process steps set forth in the following description. The invention is capable of other embodiments and of being practiced in various ways. In the following, preferred designs are provided, including such combinations as recited used alone or in unlimited combinations, the uses for which include catalysts, systems, and methods of other aspects of the present invention.

Specific Embodiments

Various embodiments are listed below. It will be understood that the embodiments listed below may be combined with all aspects and other embodiments in accordance with the scope of the invention.

Embodiment 1. A nitrous oxide ($N_2O$) removal catalyst article for an exhaust stream of an internal combustion engine comprising: a $N_2O$ removal catalytic material on a substrate, the catalytic material comprising a rhodium (Rh) component supported on a ceria-based support, wherein the catalytic material has a $H_2$-consumption peak of 100° C. or less as measured by hydrogen temperature-programmed reduction ($H_2$-TPR) and is effective to decompose nitrous oxide ($N_2O$) to nitrogen ($N_2$) and oxygen ($O_2$) and/or to reduce $N_2O$ to $N_2$ and water ($H_2O$) and/or ($CO_2$) under conditions of the exhaust stream.

Embodiment 2. The $N_2O$ removal catalyst composite of embodiment 1, wherein the $H_2$-consumption peak after aging at 750° C. for 20 hours with 10 volume % water in air occurs at a lower temperature than the temperature of the $H_2$-consumption peak of fresh catalytic material.

Embodiment 3. The $N_2O$ removal catalyst composite of any of embodiments 1-2, wherein $N_2O$ removal activity of the catalytic material after aging at 750° C. for 20 hours with 10 weight % water is higher than $N_2O$ removal activity of fresh catalytic material.

Embodiment 4. The $N_2O$ removal catalyst composite of any of embodiments 1-3, wherein the ceria-based support maintains about 90 to about 100% of its pore volume after aging at 750° C. for 20 hours with 10 volume % water in air.

Embodiment 5. The $N_2O$ removal catalyst composite of any of embodiments 1-4, wherein the ceria-based support comprises 90 to about 100 weight % $CeO_2$ and has a pore volume that is at least about 0.20 $cm^3/g$.

Embodiment 6. The $N_2O$ removal catalyst composite of any of embodiments 1-5, wherein the ceria-based support comprises a fresh surface area that is in the range of about 40 to about 200 $m^2/g$.

Embodiment 7. The $N_2O$ removal catalyst composite of any of embodiments 1-6, wherein the ceria-based support comprises a surface area that is in the range of about 20 to about 140 $m^2/g$ after aging at 750° C. for 20 hours with 10 weight % water in air.

Embodiment 8. The $N_2O$ removal catalyst composite of any of embodiments 1-7, wherein the ceria has an average crystallite size in the range of about 3 to about 20 nm measured by x-ray diffraction (XRD).

Embodiment 9. The $N_2O$ removal catalyst composite of any of embodiments 1-8, wherein the ceria-based support comprises: an x-ray diffraction average crystallite size ratio of aged to fresh material of about 2.5 or less, where aging is conducted at 750° C. for 20 hours with 10% $H_2O$ in air.

Embodiment 10. The $N_2O$ removal catalyst composite of any of embodiments 1-9, wherein the ceria-based support further comprises a promoter comprising yttria, praseodymia, samaria, gadolinia, zirconia, or silica.

Embodiment 11. The $N_2O$ removal catalyst composite of any of embodiments 1-10, wherein the ceria-based support comprises ceria in an amount in the range of about 56% to about 100% by weight of the support on an oxide basis.

Embodiment 12. The $N_2O$ removal catalyst composite of any of embodiments 1-11, wherein the rhodium component is present on the support in an amount in the range of 0.01 to 5% by weight of the ceria-based support (including the rhodium component).

Embodiment 13. The $N_2O$ removal catalyst composite of any of embodiments 1-12, wherein the rhodium component is present in an amount of about 0.04 to 3% by weight of the ceria-based support (including the rhodium component).

Embodiment 14. The $N_2O$ removal catalyst composite of any of embodiments 1-13, wherein the rhodium component has an average crystallite size of about 3 to about 20 nm.

Embodiment 15. The $N_2O$ removal catalyst composite of any of embodiments 1-14, wherein the rhodium component is loaded on the ceria-based support in an amount in the range of 1 to about 105 $g/ft^3$.

Embodiment 16. The $N_2O$ removal catalyst composite of any of embodiments 1-15, wherein the catalytic material further comprises an additional metal component.

Embodiment 17. The $N_2O$ removal catalyst composite of embodiment 16, wherein the additional metal component comprises platinum (Pt), palladium (Pd), silver (Au), copper (Cu), or combinations thereof.

Embodiment 18. The $N_2O$ removal catalyst composite of embodiment 16, wherein the catalytic material further comprises a metal oxide for promoting the Rh and/or additional metal component(s).

Embodiment 19. The $N_2O$ removal catalyst composite of embodiment 18, wherein the additional metal oxide comprises ceria, yttria, samaria, or gadolinia.

Embodiment 20. The $N_2O$ removal catalyst composite of any of embodiments 1-19, wherein the substrate comprises a monolithic substrate.

Embodiment 21. The $N_2O$ removal catalyst composite of any of embodiments 1-19, wherein the substrate comprises a wall-flow filter.

Embodiment 22. A catalyst composite for an exhaust stream of an internal combustion engine comprising: a $N_2O$ removal catalytic material in a washcoat on a substrate, the catalytic material comprising a rhodium (Rh) component supported on a ceria-based support and is effective to convert nitrous oxide ($N_2O$) under conditions of the exhaust stream, wherein the ceria-based support comprises: about 90 to about 100 weight % $CeO_2$; a pore volume that is in the range of about 0.20 to 0.40 $cm^3/g$; a fresh surface area that is in the range of about 40 to about 200 $m^2/g$; and an aged surface area that is in the range of about 20 to about 140 $m^2/g$ after aging at 750° C. for 20 hours with 10 weight % water in air.

Embodiment 23. The catalyst composite of embodiment 22, wherein the catalytic material further includes a precious group metal on a high surface area refractory metal oxide support that is effective to oxidize hydrocarbons and/or carbon monoxide under conditions of the exhaust stream.

Embodiment 24. An emissions treatment system for treatment of an internal combustion engine exhaust stream including hydrocarbons, carbon monoxide, and nitrogen oxides, the emission treatment system comprising: an exhaust conduit in fluid communication with the internal combustion engine via an exhaust manifold; a treatment catalyst; and the $N_2O$ removal catalyst composite according to any one of embodiments 1-23.

Embodiment 25. The emissions treatment system of embodiment 24, wherein the treatment catalyst comprises a nitrogen oxide treatment catalyst, which comprises: a three-way conversion (TWC) catalyst, a lean NOx trap (LNT), and/or a selective catalytic reduction (SCR) catalyst.

Embodiment 26. The emissions treatment system of either embodiment 24 or 25, wherein the $N_2O$ removal catalyst composite is located downstream of the nitrogen oxide treatment catalyst.

Embodiment 27. The emissions treatment system of either embodiment 24 or 25, wherein the system is zoned and the nitrogen oxides treatment catalyst is in a front zone and the $N_2O$ removal catalyst composite is in a back zone.

Embodiment 28. The emissions treatment system of either of embodiment 24 or 25, wherein the system is layered and the nitrogen oxides treatment catalyst is in an outer layer and the $N_2O$ removal catalytic material of the catalyst composite is in an inner layer.

Embodiment 29. The emissions treatment system of either of embodiment 24 or 25, wherein the system is layered and the nitrogen oxides treatment catalyst is in an inner layer and the $N_2O$ removal catalytic material of the $N_2O$ catalyst composite is in an outer layer.

Embodiment 30. A method for treating exhaust gases comprising contacting a gaseous stream comprising hydrocarbons, carbon monoxide, and nitrogen oxides with the $N_2O$ removal catalyst composite according to any of embodiments 1-23.

Embodiment 31. The method of embodiment 30, wherein $N_2O$ removal activity of the catalytic material after aging at 750° C. for 20 hours with 10 weight % water is higher than $N_2O$ removal activity of fresh catalytic material.

Embodiment 32. A method of making a nitrous oxide ($N_2O$) removal catalyst composite, the method comprising: depositing a rhodium component (e.g., Rh reagent) onto a fresh ceria-based support having a pore volume that is at least about 0.20 $cm^3/g$ and forming a washcoat therefrom; coating a substrate comprising a flow-through monolith or a wall-flow filter with the washcoat to form a coated substrate; and calcining the coated substrate at an elevated temperature.

Embodiment 33. The method of embodiment 32, wherein the calcining step is under conditions of 750° C. for 20 hours with 10 volume % water in air.

Embodiment 34. The method of embodiment 32, wherein the ceria-containing support is pre-calcined at 700° C. for 2 hours before Rh deposition.

EXAMPLES

The following non-limiting examples shall serve to illustrate the various embodiments of the present invention. In each of the examples, the substrate was cordierite.

Example 1: Preparation

Method 1.1. Rh nitrate solution was impregnated onto a powder ceria support with incipient wetness technique to achieve a desirable Rh metal loading. The Rh-impregnated support was then dispersed in deionized water to achieve 30% solid and the slurry pH was adjusted with $HNO_3$ to 4. The resulting slurry was milled and dried while stirring. The dried slurry was calcined at 500° C. for 2 hours in air and then crushed and sieved to 250 to 500 μm for reactor testing.

Method 1.2. The procedure was the same as in Method 1.1 with one exception; the final calcination temperature was 800° C.

Method 1.3. A support powder was first pre-calcined at 800° C. for 2 hours in air before metal impregnation. The rest of the procedures were the same as Method 1.1.

Method 1.4. A support powder was first dispersed in deionized water to reach 30% solid content. The slurry was then milled, and Rh nitrate solution (or a nitrate solution of Rh+another metal) was added to the milled slurry. The slurry was dried while stirring. The dried slurry was calcined at 500° C. for 2 hours in air and then crushed and sieved to 250-500 μm for reactor testing.

Method 1.5. Rh nitrate solution was impregnated onto a powder support with the incipient wetness technique to achieve a desirable Rh metal loading. The Rh/support powder was dried and calcined at 500° C. for 2 hours. The resulting material was impregnated with another metal (such as Pt or Pd) using the same methodology and then dried and calcined at 500° C. for 2 hours. The bimetallic catalyst powder was then dispersed in deionized water to achieve 30% solid and the slurry pH was adjusted with $HNO_3$ to 4. The resulting slurry was milled and dried while stirring. The dried slurry was calcined at 500° C. for 2 hours in air and then crushed and sieved to 250-500 μm for reactor testing.

Method 1.6. For supported Au/Rh and Ir/Rh catalyst, the procedures were similar to Method 1.5. However, a washing step was added before the slurry step using $CO_2$ saturated deionized water to remove Cl ions.

Method 1.7. Rh and another metal (or oxide) were co-impregnated onto a $CeO_2$ support using the incipient wetness technique. The rest of the preparation procedures were the same as Method 1.1.

Method 1.8. A cerium oxide support was modified by a rare earth metal oxide (10% by weight) by impregnating a rare earth metal nitrate solution onto the support using the incipient wetness technique. This modified cerium oxide powder was dried at 110° C. for 2 hours and then calcined at 500° C. for 2 hours. This resulting powder was then impregnated with Rh with the same methodology to achieve a desirable Rh metal loading. The resulting powder was then dispersed in deionized water to achieve 30% solid and the slurry pH was adjusted with $HNO_3$ to 4. The resulting slurry was milled and dried while stirring. The dried slurry was calcined at 500° C. for 2 hours in air and then crushed and sieved to 250-500 μm for reactor testing.

Method 1.9. The order of impregnation for Rh and another metal in Method 1.8 was reversed. The rest of the procedures were the same.

Example 2: Ceria-Based Support Characteristics

Table 1 summarizes some physical and chemical characterization data, including BET surface area, pore volume, average pore radius and X-ray diffraction data collected on a number of $CeO_2$ support materials as well as $H_2$ temperature programmed reduction data obtained on resulting Rh/$CeO_2$ catalysts. Conditions for aging of all $CeO_2$ materials were: 750° C. for 20 hours with 10% $H_2O$ in air. Rh/$CeO_2$ catalysts tested contained 1% Rh on $CeO_2$ by weight.

Hydrogen temperature-programmed reduction ($H_2$-TPR) was carried out on a Micromeritics AutoChem Series Instrument. Prior to the test, each sample was pretreated under a flow of 4% $O_2$ balanced with He at 500° C. for 30 min and then cooled down to ambient temperature. The TPR experiment was performed in 1% $H_2$ balanced with $N_2$ at a gas flow rate of 50 cc/min and the temperature was ramped from 20 to 900° C. at a ramping rate of 10° C./min.

The $H_2$-TPR results show that Rh/$CeO_2$(D) is easiest to reduce ($1^{st}$ peak at 85° C. fresh and 71° C. aged) and also has the highest $H_2$ consumption.

Example 3

The effect of $CeO_2$ material type and thermal treatment was analyzed for various $N_2O$ catalysts having a composition of 1% weight Rh/$CeO_2$ using the supports described in Example 2. Table 2 provides a summary of the catalyst powders prepared.

TABLE 2

| Catalyst ID | Rh Loading (%) | EXAMPLE 2 Support Type | Support composition | Preparation Method |
|---|---|---|---|---|
| 3.1 | 1 | $CeO_2$ (A) | 100% $CeO_2$ | 1.1 |
| 3.2 | 1 | $CeO_2$ (B) | 100% $CeO_2$ | 1.1 |
| 3.3 | 1 | $CeO_2$ (C) | 100% $CeO_2$ | 1.1 |
| 3.4 | 1 | $CeO_2$ (D) | 100% $CeO_2$ | 1.1 |
| 3.5 | 1 | $CeO_2$ (A) | 100% $CeO_2$ | 1.2 |
| 3.6 | 1 | $CeO_2$ (A) | 100% $CeO_2$ | 1.3 |
| 3.7 | 1 | $CeO_2$ (B) | 100% $CeO_2$ | 1.2 |
| 3.8 | 1 | $CeO_2$ (C) | 100% $CeO_2$ | 1.2 |
| 3.9 | 1 | $CeO_2$ (D) | 100% $CeO_2$ | 1.4 |

Tables 3A, 3B, and 3C provide the $N_2O$ removal (specifically decomposition) activity, in terms of $N_2O$ conversion, of the catalysts under various simulated feed conditions, as freshly-produced and after 20 hours aging at 750° C., comparing the $N_2O$ activities of a group of Rh/$CeO_2$ catalysts as a function of $CeO_2$ material. The $N_2O$ decomposition activities were measured with a high-throughput reactor capable of testing multiple samples in a single test run. The basic reaction feed contained 200 ppm $N_2O$, 5 wt.-% $CO_2$ and balance $N_2$. In separate tests, 5 wt. % $O_2$ or 5 wt. % $O_2$+5% $H_2O$ by volume were added to the basic feed, respectively. The activity was measured at constant temperatures of 250, 300, 350, 400 and 450° C. For each run, 0.2 grams of sample was used with a flow rate of 50

TABLE 1

| Support material & Aging condition | BET surface area (m$^2$/g) | Pore volume (cm$^3$/g) | Pore radius (nm) | % Change in BET (rel. to fresh) | % Change in pore volume (rel. to fresh) | XRD Crystallite size (nm) | XRD size ratio (Aged/Fresh) | Rh/$CeO_2$ $H_2$-TPR $1^{st}$ peak Temp. (° C.) |
|---|---|---|---|---|---|---|---|---|
| $CeO_2$ (A), Fresh | 144 | 0.31 | 3.5 | N/A | N/A | 6.2 | | 91 |
| $CeO_2$ (B), Fresh | 177 | 0.07 | 2.0 | N/A | N/A | 6.7 | | 125 |
| $CeO_2$ (C), Fresh | 159 | 0.21 | 2.7 | N/A | N/A | 6.5 | | 99 |
| $CeO_2$ (D), Fresh | 131 | 0.32 | 3.8 | N/A | N/A | 7.3 | | 85 |
| $CeO_2$ (A), Aged | 77 | 0.30 | 5.7 | −47 | −3 | 12.9 | 2.1 | 85 |
| $CeO_2$ (B), Aged | 13 | 0.04 | 4.0 | −93 | −43 | 39.8 | 5.9 | 88 |
| $CeO_2$ (C), Aged | 54 | 0.19 | 5.6 | −66 | −10 | 15.5 | 2.4 | 95 |
| $CeO_2$ (D), Aged | 70 | 0.31 | 6.7 | −47 | −3 | 14.9 | 2.0 | 71 |

Regarding BET surface area, $CeO_2$(A) and $CeO_2$(D) have the least decrease after 750° C./20 h aging. As to pore volume, $CeO_2$(A) and $CeO_2$(D) have the largest pore volume and the least change after aging (−3%). $CeO_2$(A) and $CeO_2$(D) have the least crystal agglomeration after aging.

L/min, which is equivalent a monolithic GHSV of 30,000 h$^{-1}$ with 2 g/in$^3$ washcoat loading. Each catalyst was tested as-fresh (as-is) and aged (750° C. for 20 hours with 10 wt.-% $H_2O$ in air) sample. $N_2O$ only refers to a dry feed, $N_2O+O_2$ refers to an air-containing feed, and $N_2O+O_2+H_2O$ refers to a wet air feed (nominal % water by volume).

TABLE 3A

| | $N_2O$ only | | | |
|---|---|---|---|---|
| | 300° C. | 350° C. | 400° C. | 450° C. |
| FRESH Catalyst | | | | |
| 3.1 | 11 | 25 | 70 | 91 |
| 3.2 | 4 | 13 | 43 | 73 |
| 3.3 | 3 | 11 | 40 | 73 |
| 3.4 | 51 | 97 | 100 | 100 |
| 3.5 | 26 | 75 | 95 | 98 |
| 3.6 | 55 | 92 | 97 | 97 |
| 3.7 | 4 | 18 | 55 | 82 |
| 3.8 | 13 | 43 | 85 | 97 |
| 3.9 | 52 | 89 | 99 | 99 |
| 750° C. AGED Catalyst | | | | |
| 3.1 | 9 | 29 | 80 | 96 |
| 3.2 | 1 | 5 | 24 | 55 |
| 3.3 | 1 | 12 | 50 | 80 |
| 3.4 | 74 | 100 | 100 | 100 |
| 3.5 | 38 | 88 | 99 | 100 |
| 3.6 | 34 | 71 | 85 | 90 |
| 3.7 | 1 | 11 | 44 | 74 |
| 3.8 | 6 | 31 | 71 | 90 |
| 3.9 | 56 | 98 | 100 | 100 |

TABLE 3B

| | $N_2O + O_2$ | | | |
|---|---|---|---|---|
| | 300° C. | 350° C. | 400° C. | 450° C. |
| FRESH Catalyst | | | | |
| 3.1 | 4 | 20 | 41 | 77 |
| 3.2 | 1 | 8 | 25 | 56 |
| 3.3 | 0 | 6 | 21 | 53 |
| 3.4 | 34 | 91 | 99 | 100 |
| 3.5 | 16 | 65 | 88 | 95 |
| 3.6 | 38 | 87 | 95 | 97 |
| 3.7 | 2 | 4 | 37 | 64 |
| 3.8 | 7 | 17 | 67 | 88 |
| 3.9 | 30 | 89 | 97 | 99 |
| 750° C. AGED Catalyst | | | | |
| 3.1 | 7 | 13 | 57 | 87 |
| 3.2 | 0 | 1 | 12 | 36 |
| 3.3 | 1 | 3 | 32 | 65 |
| 3.4 | 51 | 96 | 99 | 100 |
| 3.5 | 24 | 81 | 96 | 98 |
| 3.6 | 22 | 61 | 79 | 84 |
| 3.7 | 1 | 3 | 26 | 56 |
| 3.8 | 4 | 7 | 53 | 80 |
| 3.9 | 37 | 93 | 100 | 100 |

TABLE 3C

| | $N_2O + O_2 + H_2O$ | | | |
|---|---|---|---|---|
| | 300° C. | 350° C. | 400° C. | 450° C. |
| FRESH Catalyst | | | | |
| 3.1 | 0 | 2 | 15 | 37 |
| 3.2 | 0 | 0 | 6 | 27 |
| 3.3 | 0 | 0 | 4 | 20 |
| 3.4 | 0 | 4 | 24 | 60 |
| 3.5 | 1 | 4 | 29 | 59 |
| 3.6 | 1 | 8 | 38 | 78 |
| 3.7 | 0 | 1 | 10 | 23 |
| 3.8 | 0 | 0 | 19 | 44 |
| 3.9 | 0 | 2 | 30 | 67 |
| 750° C. AGED Catalyst | | | | |
| 3.1 | 1 | 2 | 29 | 47 |
| 3.2 | 0 | 1 | 7 | 9 |
| 3.3 | 0 | 1 | 15 | 23 |
| 3.4 | 0 | 4 | 36 | 77 |
| 3.5 | 1 | 3 | 22 | 58 |
| 3.6 | 0 | 3 | 18 | 46 |
| 3.7 | 0 | 1 | 9 | 16 |
| 3.8 | 0 | 1 | 16 | 33 |
| 3.9 | 0 | 4 | 64 | 92 |

Catalysts 3.1 to 3.4 are Rh supported on different $CeO_2$ materials made with the same preparation method, as summarized in Table 2 of Example 3. Catalysts 3.1 and 3.4, supported on $CeO_2(A)$ and $CeO_2(D)$, respectively, are the most active Rh/$CeO_2$ catalysts. Surprisingly, the aged activities of these two catalysts are higher than their fresh activities. Catalysts 3.2 and 3.3, supported on $CeO_2(B)$ and $CeO_2(C)$, respectively, are less active for $N_2O$ decomposition than Catalysts 3.1 and 3.4 under all test conditions. In contrast to Catalysts 3.1 and 3.4, the aged $N_2O$ conversions of Catalysts 3.2 and 3.3 are significantly lower than their fresh catalysts.

Tables 3A, 3B, and 3C also show the effect of thermal treatment of Rh/$CeO_2$ catalysts as a part of catalyst preparation step. A high temperature (800° C./2 hours) calcination treatment of Rh/$CeO_2$ increases the $N_2O$ conversion on all Rh/$CeO_2$ catalysts and under all test and catalyst aging conditions. For example, high temperature calcined Rh/$CeO_2$(A)-Catalyst 3.5 has a $N_2O$ conversion of 55% at 450° C. after aging tested with 5% $H_2O$ by volume in feed, which compares favorably with 47% of its parent catalyst (Catalyst 3.1) tested under the same conditions. The conversion increase on the fresh activity is even more pronounced (59% on Catalyst 3.5 vs. 37% on Catalyst 3.1 at 450° C.). For Rh/$CeO_2$(B) and Rh/$CeO_2$(C), the conversion increases on aged catalysts at 450° C. are 16% (Catalyst 3.7) from 9% (Catalyst 3.2) and 33% (Catalyst 3.8) from 23% (Catalyst 3.3), respectively. Thermal calcination of the $CeO_2$ support (800° C./2 hours) before Rh impregnation also promotes the $N_2O$ activity. Catalyst 3.6, its support was pre-calcined before Rh impregnation, is much more active for all fresh $N_2O$ activity tests than Catalyst 3.1; its conversion is 78% at 450° C. tested with a wet feed vs. 37% for Catalyst 3.1 under the same conditions. In addition, catalyst preparation method also has a significant impact on $N_2O$ activity. For example, Catalyst 3.9 (Rh supported $CeO_2$(D) made with Rh solution added in the $CeO_2$(D) slurry) has a $N_2O$ conversion of 92% at 450° C. after aging tested with 5% $H_2O$ by volume, whereas aged Catalyst 3.4 (Rh supported on $CeO_2$(D) made with the incipient wetness technique) has a conversion of 60% under the same conditions.

Example 4

The effect of modifying $CeO_2$ with rare earth (RE) metal oxides was analyzed for various $N_2O$ decomposition catalysts having a composition of 1% Rh/—RE—$CeO_2$. Table 4 provides a summary of the catalyst powders prepared.

TABLE 4

| Catalyst ID | Rh Loading (%) | EXAMPLE 2 Support Type | Support composition | Preparation Method |
|---|---|---|---|---|
| 3.1 | 1 | $CeO_2$ (A) | 100% $CeO_2$ | 1.1 |
| 4.1 | 1 | $Y_2O_3/CeO_2$ (A) | 10% $Y_2O_3/CeO_2$ (A) | 1.8 |
| 4.2 | 1 | $La_2O_3/CeO_2$ (A) | 10% $La_2O_3/CeO_2$ (A) | 1.8 |
| 4.3 | 1 | $Pr_2O_3/CeO_2$ (A) | 10% $Pr_2O_3/CeO_2$ (A) | 1.8 |
| 4.4 | 1 | $Nd_2O_3/CeO_2$ (A) | 10% $Nd_2O_3/CeO_2$ (A) | 1.8 |
| 4.5 | 1 | $Sm_2O_3/CeO_2$ (A) | 10% $Sm_2O_3/CeO_2$ (A) | 1.8 |
| 4.6 | 1 | $Gd_2O_3/CeO_2$ (A) | 10% $Gd_2O_3/CeO_2$ (A) | 1.8 |
| 4.7 | 1 | $CeO_2/CeO_2$ (A) | 10% $CeO_2/CeO_2$ (A) | 1.8 |

Tables 5A, 5B, and 5C provide the $N_2O$ removal activity, in terms of $N_2O$ conversion, of the catalysts under various simulated feed conditions, as freshly-produced and after 20 hours aging at 750° C., comparing the $N_2O$ activities of a group of Rh/$CeO_2$ catalysts as a function of RE—$CeO_2$ material. $N_2O$ only refers to a dry feed, $N_2O+O_2$ refers to an air-containing feed, and $N_2O+O_2+H_2O$ refers to a wet air feed (nominal 5% water by volume).

TABLE 5A

| | $N_2O$ only | | | |
|---|---|---|---|---|
| | 300° C. | 350° C. | 400° C. | 450° C. |
| FRESH Catalyst | | | | |
| 3.1 | 11 | 25 | 70 | 91 |
| 4.1 | 20 | 67 | 97 | 100 |
| 4.2 | 3 | 14 | 43 | 82 |
| 4.3 | 14 | 53 | 92 | 100 |
| 4.4 | 17 | 64 | 94 | 100 |
| 4.5 | 27 | 76 | 97 | 100 |
| 4.6 | 23 | 69 | 95 | 100 |
| 4.7 | 19 | 43 | 90 | 98 |
| 750° C. AGED Catalyst | | | | |
| 3.1 | 9 | 29 | 80 | 96 |
| 4.1 | 0 | 1 | 6 | 23 |
| 4.2 | 0 | 1 | 8 | 33 |
| 4.3 | 3 | 6 | 48 | 87 |
| 4.4 | 2 | 6 | 45 | 83 |
| 4.5 | 2 | 7 | 57 | 91 |
| 4.6 | 2 | 5 | 39 | 77 |
| 4.7 | 8 | 29 | 78 | 92 |

TABLE 5B

| | $N_2O + O_2$ | | | |
|---|---|---|---|---|
| | 300° C. | 350° C. | 400° C. | 450° C. |
| FRESH Catalyst | | | | |
| 3.1 | 4 | 20 | 41 | 77 |
| 4.1 | 9 | 58 | 80 | 98 |
| 4.2 | 0 | 9 | 32 | 64 |
| 4.3 | 5 | 41 | 72 | 95 |
| 4.4 | 7 | 51 | 80 | 96 |
| 4.5 | 14 | 67 | 86 | 98 |
| 4.6 | 11 | 61 | 83 | 96 |
| 4.7 | 8 | 42 | 69 | 93 |
| 750° C. AGED Catalyst | | | | |
| 3.1 | 7 | 13 | 57 | 87 |
| 4.1 | 0 | 0 | 2 | 13 |
| 4.2 | 0 | 1 | 4 | 20 |
| 4.3 | 2 | 9 | 16 | 65 |
| 4.4 | 2 | 10 | 16 | 61 |
| 4.5 | 2 | 12 | 19 | 72 |
| 4.6 | 1 | 8 | 13 | 54 |
| 4.7 | 6 | 10 | 57 | 84 |

TABLE 5C

| | $N_2O + O_2 + H_2O$ | | | |
|---|---|---|---|---|
| | 300° C. | 350° C. | 400° C. | 450° C. |
| FRESH Catalyst | | | | |
| 3.1 | 0 | 2 | 15 | 37 |
| 4.1 | 0 | 0 | 5 | 51 |
| 4.2 | 0 | 0 | 1 | 14 |
| 4.3 | 0 | 0 | 5 | 41 |
| 4.4 | 0 | 0 | 6 | 47 |
| 4.5 | 0 | 1 | 8 | 57 |
| 4.6 | 0 | 0 | 7 | 48 |
| 4.7 | 0 | 1 | 18 | 41 |
| 750° C. AGED Catalyst | | | | |
| 3.1 | 1 | 2 | 29 | 47 |
| 4.1 | 0 | 0 | 0 | 1 |
| 4.2 | 0 | 0 | 1 | 2 |
| 4.3 | 1 | 1 | 3 | 14 |
| 4.4 | 0 | 0 | 2 | 11 |
| 4.5 | 1 | 1 | 3 | 15 |
| 4.6 | 0 | 1 | 2 | 9 |
| 4.7 | 1 | 2 | 22 | 43 |

Catalyst 3.1 is a "parent" catalyst, which is one containing no additional added rare earth, compared to Catalysts 4.1-4.7. Rare earth modification of $CeO_2$ by impregnation increases the fresh $N_2O$ conversion. Performance is lower than the parent catalyst after aging.

Example 5

The effect of modifying Rh—$CeO_2$ by addition of platinum group or other metals (ME) was analyzed for various $N_2O$ removal catalysts having various compositions of n % ME/1% Rh/$CeO_2$. Table 6 provides a summary of the catalyst powders prepared.

TABLE 6

| Catalyst ID | Rh Loading (%) | Other metal (n %) | EXAMPLE 2 Support Type | Support composition | Preparation Method |
|---|---|---|---|---|---|
| 3.9 | 1 | | $CeO_2$ (D) | 100% $CeO_2$ | 1.4 |
| 5.1 | 1 | 2% Cu | $CeO_2$ (D) | 100% $CeO_2$ | 1.7 |
| 5.2 | 1 | 0.2% Ru | $CeO_2$ (D) | 100% $CeO_2$ | 1.7 |
| 5.3 | 1 | 0.2% Pd | $CeO_2$ (D) | 100% $CeO_2$ | 1.7 |
| 5.4 | 1 | 0.2% Ag | $CeO_2$ (D) | 100% $CeO_2$ | 1.7 |
| 5.5 | 1 | 0.2% Pt | $CeO_2$ (D) | 100% $CeO_2$ | 1.7 |
| 5.6 | 1 | 0.2% Ir | $CeO_2$ (D) | 100% $CeO_2$ | 1.6 |

TABLE 6-continued

| Catalyst ID | Rh Loading (%) | Other metal (n %) | EXAMPLE 2 Support Type | Support composition | Preparation Method |
|---|---|---|---|---|---|
| 5.7 | 1 | 0.02% Au | CeO$_2$ (D) | 100% CeO$_2$ | 1.6 |
| 5.8 | 1 | 0.2% Au | CeO$_2$ (D) | 100% CeO$_2$ | 1.6 |
| 5.9 | 1 | 0.02% Pd | CeO$_2$ (D) | 100% CeO$_2$ | 1.5 |
| 5.10 | 1 | 0.2% Pd | CeO$_2$ (D) | 100% CeO$_2$ | 1.5 |
| 5.11 | 1 | 0.02% Pt | CeO$_2$ (D) | 100% CeO$_2$ | 1.5 |
| 5.12 | 1 | 0.2% Pt | CeO$_2$ (D) | 100% CeO$_2$ | 1.9 |
| 5.13 | 1 | 0.2% Pd | CeO$_2$ (D) | 100% CeO$_2$ | 1.9 |
| 5.14 | 1 | 1% Pd | CeO$_2$ (D) | 100% CeO$_2$ | 1.9 |
| 5.15 | 1 | 1% Pt | CeO$_2$ (D) | 100% CeO$_2$ | 1.9 |

Tables 7A, 7B, and 7C provide the N$_2$O removal activity, in terms of N$_2$O conversion, of the catalysts under various simulated feed conditions, as freshly-produced and after 20 hours aging at 750° C., comparing the N$_2$O activities of a group of Rh/CeO$_2$ catalysts as a function of secondary metal addition. N$_2$O only refers to a dry feed, N$_2$O+O$_2$ refers to an air-containing feed, and N$_2$O+O$_2$+H$_2$O refers to a wet air feed (nominal 5 wt.-% water).

TABLE 7A

| | N$_2$O only | | | |
|---|---|---|---|---|
| | 300° C. | 350° C. | 400° C. | 450° C. |
| FRESH Catalyst | | | | |
| 3.9 | 52 | 89 | 99 | 99 |
| 5.1 | 44 | 90 | 100 | 100 |
| 5.2 | 47 | 92 | 100 | 100 |
| 5.3 | 56 | 96 | 100 | 100 |
| 5.4 | 52 | 94 | 100 | 100 |
| 5.5 | 41 | 85 | 100 | 100 |
| 5.6 | 34 | 84 | 100 | 100 |
| 5.7 | 46 | 91 | 100 | 100 |
| 5.8 | 30 | 83 | 100 | 100 |
| 5.9 | 86 | 100 | 100 | 100 |
| 5.10 | 52 | 96 | 100 | 100 |
| 5.11 | 56 | 95 | 100 | 100 |
| 5.12 | 59 | 95 | 100 | 100 |
| 5.13 | 53 | 97 | 100 | 100 |
| 5.14 | 61 | 98 | 100 | 100 |
| 5.15 | 54 | 98 | 100 | 100 |
| 750° C. AGED Catalyst | | | | |
| 3.9 | 56 | 98 | 100 | 100 |
| 5.1 | 27 | 71 | 100 | 100 |
| 5.2 | 47 | 91 | 100 | 100 |
| 5.3 | 45 | 94 | 100 | 100 |
| 5.4 | 74 | 100 | 100 | 100 |
| 5.5 | 38 | 92 | 100 | 99 |
| 5.6 | 43 | 93 | 96 | 96 |
| 5.7 | 52 | 94 | 97 | 97 |
| 5.8 | 43 | 95 | 98 | 98 |
| 5.9 | 71 | 100 | 100 | 100 |
| 5.10 | 44 | 93 | 99 | 99 |
| 5.11 | 67 | 98 | 99 | 99 |
| 5.12 | 62 | 99 | 100 | 100 |
| 5.13 | 44 | 94 | 100 | 100 |
| 5.14 | 38 | 91 | 100 | 100 |
| 5.15 | 39 | 89 | 96 | 96 |

TABLE 7B

| | N$_2$O + O$_2$ | | | |
|---|---|---|---|---|
| | 300° C. | 350° C. | 400° C. | 450° C. |
| FRESH Catalyst | | | | |
| 3.9 | 30 | 89 | 97 | 99 |
| 5.1 | 24 | 83 | 98 | 100 |
| 5.2 | 33 | 92 | 98 | 100 |
| 5.3 | 34 | 94 | 100 | 100 |
| 5.4 | 33 | 94 | 99 | 100 |
| 5.5 | 26 | 83 | 97 | 100 |
| 5.6 | 20 | 73 | 97 | 100 |
| 5.7 | 28 | 86 | 99 | 100 |
| 5.8 | 21 | 79 | 98 | 100 |
| 5.9 | 61 | 99 | 100 | 100 |
| 5.10 | 35 | 95 | 100 | 100 |
| 5.11 | 35 | 91 | 99 | 100 |
| 5.12 | 38 | 93 | 99 | 100 |
| 5.13 | 35 | 96 | 100 | 100 |
| 5.14 | 43 | 95 | 100 | 100 |
| 5.15 | 35 | 95 | 100 | 100 |
| 750° C. AGED Catalyst | | | | |
| 3.9 | 37 | 93 | 100 | 100 |
| 5.1 | 18 | 59 | 92 | 100 |
| 5.2 | 32 | 83 | 98 | 99 |
| 5.3 | 32 | 90 | 100 | 100 |
| 5.4 | 50 | 96 | 100 | 100 |
| 5.5 | 28 | 84 | 99 | 99 |
| 5.6 | 31 | 84 | 96 | 96 |
| 5.7 | 36 | 90 | 97 | 97 |
| 5.8 | 31 | 84 | 98 | 98 |
| 5.9 | 52 | 98 | 100 | 100 |
| 5.10 | 33 | 87 | 98 | 99 |
| 5.11 | 47 | 96 | 99 | 99 |
| 5.12 | 44 | 97 | 100 | 100 |
| 5.13 | 33 | 88 | 100 | 100 |
| 5.14 | 31 | 82 | 99 | 100 |
| 5.15 | 32 | 82 | 95 | 96 |

TABLE 7C

| | N$_2$O + O$_2$ + H$_2$O | | | |
|---|---|---|---|---|
| | 300° C. | 350° C. | 400° C. | 450° C. |
| FRESH Catalyst | | | | |
| 3.9 | 0 | 2 | 30 | 67 |
| 5.1 | 0 | 1 | 20 | 60 |
| 5.2 | 0 | 2 | 26 | 70 |
| 5.3 | 0 | 2 | 31 | 69 |
| 5.4 | 0 | 2 | 24 | 62 |
| 5.5 | 0 | 2 | 28 | 62 |
| 5.6 | 0 | 2 | 26 | 49 |
| 5.7 | 0 | 3 | 38 | 61 |
| 5.8 | 0 | 2 | 30 | 56 |
| 5.9 | 0 | 5 | 61 | 84 |
| 5.10 | 0 | 3 | 46 | 70 |
| 5.11 | 1 | 5 | 66 | 85 |
| 5.12 | 0 | 6 | 62 | 81 |
| 5.13 | 0 | 3 | 47 | 72 |
| 5.14 | 0 | 3 | 38 | 74 |
| 5.15 | 0 | 4 | 44 | 69 |
| 750° C. AGED Catalyst | | | | |
| 3.9 | 0 | 4 | 64 | 92 |
| 5.1 | 0 | 0 | 38 | 65 |
| 5.2 | 1 | 2 | 39 | 79 |
| 5.3 | 1 | 3 | 60 | 91 |
| 5.4 | 1 | 3 | 58 | 88 |
| 5.5 | 0 | 3 | 62 | 90 |

TABLE 7C-continued

| | $N_2O + O_2 + H_2O$ | | | |
|---|---|---|---|---|
| | 300° C. | 350° C. | 400° C. | 450° C. |
| 5.6 | 0 | 3 | 49 | 79 |
| 5.7 | 0 | 4 | 55 | 83 |
| 5.8 | 0 | 4 | 54 | 82 |
| 5.9 | 0 | 4 | 56 | 90 |
| 5.10 | 0 | 3 | 50 | 83 |
| 5.11 | 0 | 5 | 67 | 91 |
| 5.12 | 0 | 5 | 68 | 93 |
| 5.13 | 0 | 4 | 56 | 88 |
| 5.14 | 0 | 3 | 49 | 88 |
| 5.15 | 0 | 4 | 58 | 88 |

The "parent" catalyst here is Catalyst 3.9 [Rh/CeO$_2$(D)], which contains Rh only. Incorporating some Pd, Pt and Ru (especially Pd and Pt) into Catalyst 3.9 significantly increases the N$_2$O conversion on fresh catalysts. The improved catalysts are Catalysts 5.9-5.15, Catalysts 5.2-5.3. Some Pd- or Pt-modified catalysts are even slightly more active than or comparable to the reference after aging (Catalysts 5.6 and 5.11-5.12).

Example 6

A N$_2$O catalyst composite was prepared using a catalyst according to 3.1. Rh nitrate solution was impregnated onto a powder support (CeO$_2$) with the incipient wetness technique to achieve a desirable Rh metal loading. The resulting powder was dried at 110° C. for 5 hours then calcined at 550° C. for 2 hours to form catalytic material, a portion of which was retained for testing.

The catalytic material/calcined powder was then dispersed in water and milled in a continuous mill to D$_{90}$<12 μm (90% particles with a diameter less than 12 μm) to form a washcoat. The slurry of the pH was adjusted using acetic acid to pH=5, and the solid content of the slurry was about 37%. A monolith substrate, with a cell density of 600 cells/in$^2$ and 0.10 mm wall thickness, was immersed into the slurry for a few seconds. Compressed air was blown through the coated monolith to remove excess coating. The coated sample was dried in flowing air at about 200° C. for 20 minutes and then calcined at 550° C. for 2 hours to form a catalytic composite. The sample after calcination contained 35 g/ft$^3$ Rh and 2 g/in$^3$ support (CeO$_2$).

Example 7 (Comparative)

A comparative N$_2$O catalyst composite was prepared using Rh on alumina (Al$_2$O$_3$). Rh nitrate solution was impregnated onto a powder support (Al$_2$O$_3$) with the incipient wetness technique to achieve a desirable Rh metal loading. The resulting powder was dried at 110° C. for 5 hours then calcined at 550° C. for 2 hours. The calcined powder was then dispersed in water and milled in a continuous mill to D$_{90}$<12 μm (90% particles with a diameter less than 12 μm). The slurry of the pH was adjusted using acetic acid to pH=5, and the solid content of the slurry was about 37%. A monolith substrate, with a cell density of 600 cells/in$^2$ and 0.10 mm wall thickness, was immersed into the slurry for a few seconds. Compressed air was blown through the coated monolith to remove excess coating. The coated sample was dried in flowing air at about 200° C. for 20 minutes and then calcined at 550° C. for 2 hours. The sample after calcination contained 35 g/ft$^3$ Rh and 2 g/in$^3$ support (Al$_2$O$_3$).

Example 8

The catalytic material/calcined powder of Examples 6-7 were tested in a high throughput reactor for N$_2$O decomposition activity.

Figure 11:
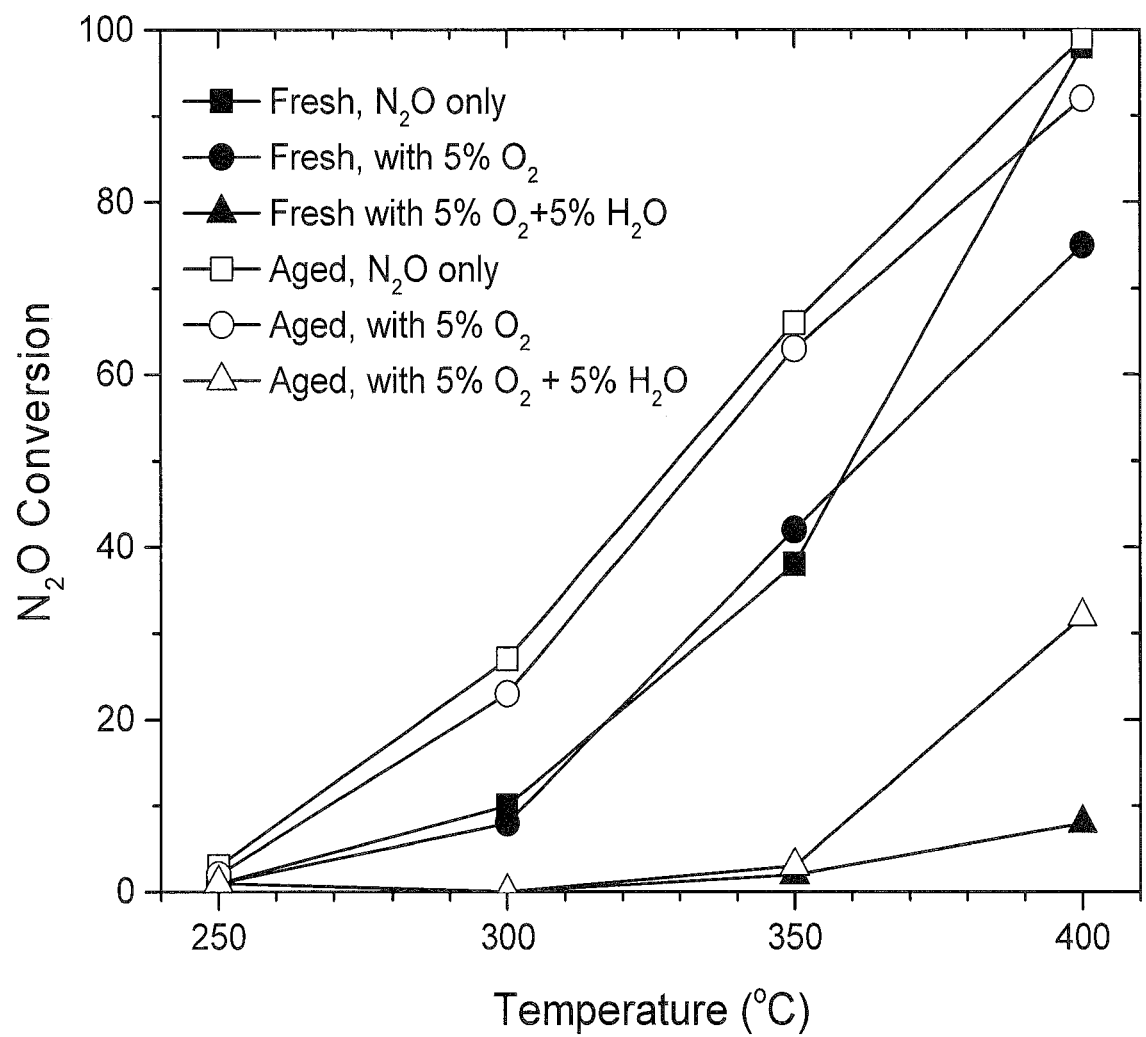
FIG. 11 provides $N_2O$ conversion versus temperature for an inventive $N_2O$ catalytic material.

FIG. 11 provides N$_2$O activities over the catalytic material of Example 6. Over either fresh or aged catalyst, H$_2$O has a strong impact on N$_2$O conversion. However, the aged catalyst is unexpectedly more active than the fresh, especially with a wet feed.

Figure 12:
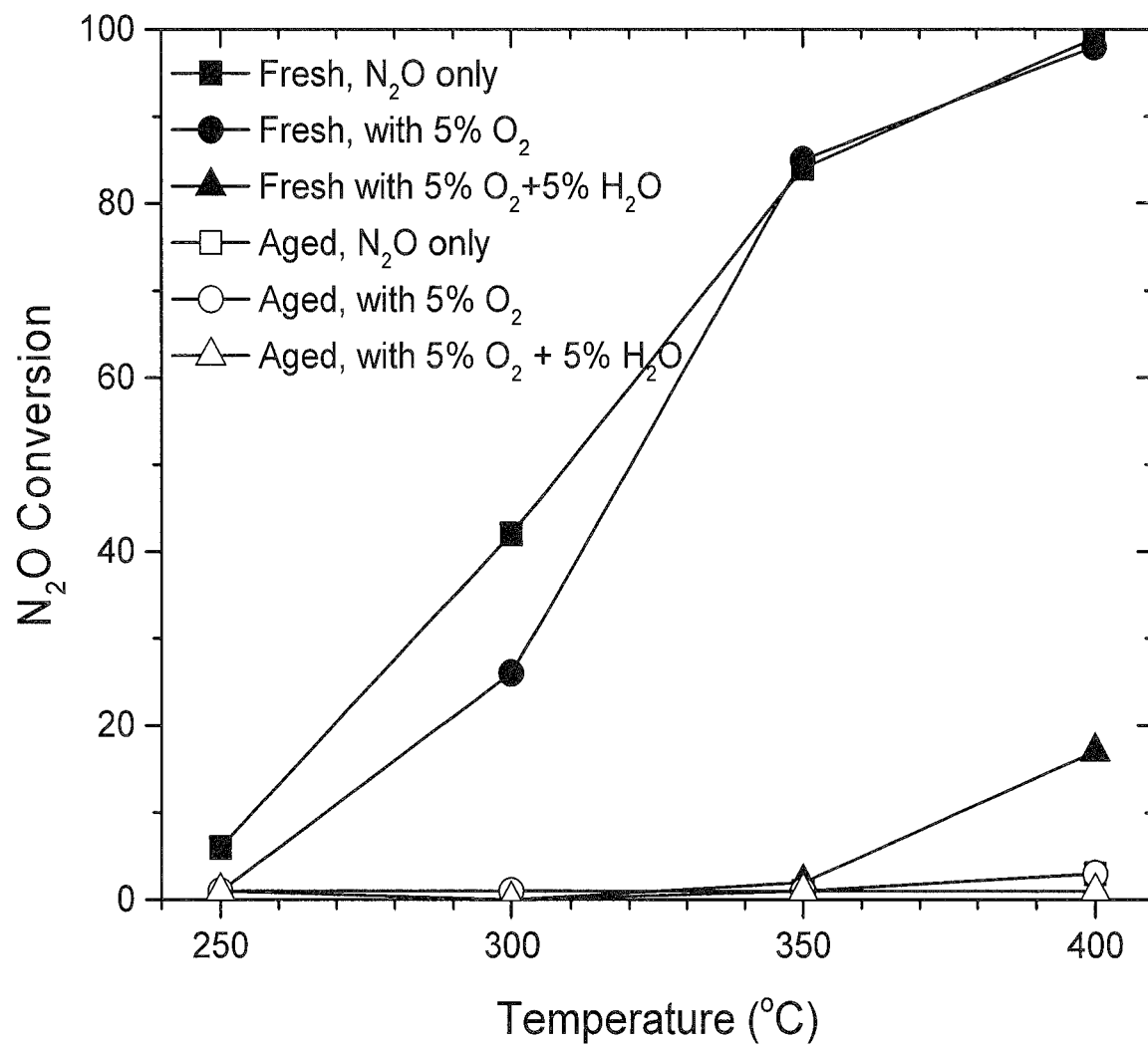
FIG. 12 provides $N_2O$ conversion versus temperature for a comparative $N_2O$ catalytic material.

FIG. 12 shows N$_2$O activities over the catalytic material of Comparative Example 7. Although the fresh catalyst is more active than the catalyst shown in FIG. 11, its activity is severely deactivated by aging. The N$_2$O conversion is near zero after aging tested with a wet feed.

Example 9 (Testing)

The monolith catalyst of Examples 6-7 were tested as follows. The N$_2$O decomposition activities were measured with a laboratory, steady-state flow reactor at GHSV=30,000 h$^{-1}$. The sample was a 1 inch (diameter)×1 inch (length) monolith core positioned in the rear part of an electrical furnace. The basic reaction feed contained 200 ppm N$_2$O, 5 wt. % CO$_2$ and balance N$_2$. In separate tests, 5 wt. % 0$_2$ or 5 wt. % O$_2$+5% H$_2$O by volume were added to the basic feed, respectively. The activity was measured between 200 and 500° C. with a temperature ramp at a ramp rate of 15° C./min. The effluent gas composition was measured by a MKS FTIR Analyzer (Model 2030DGB2EVS13T) at a collection speed of 1Hz. Each sample was tested as fresh (as-is) and aged (750° C. for 20 hours with 10. % H$_2$O by volume in air) sample.

Figure 13:
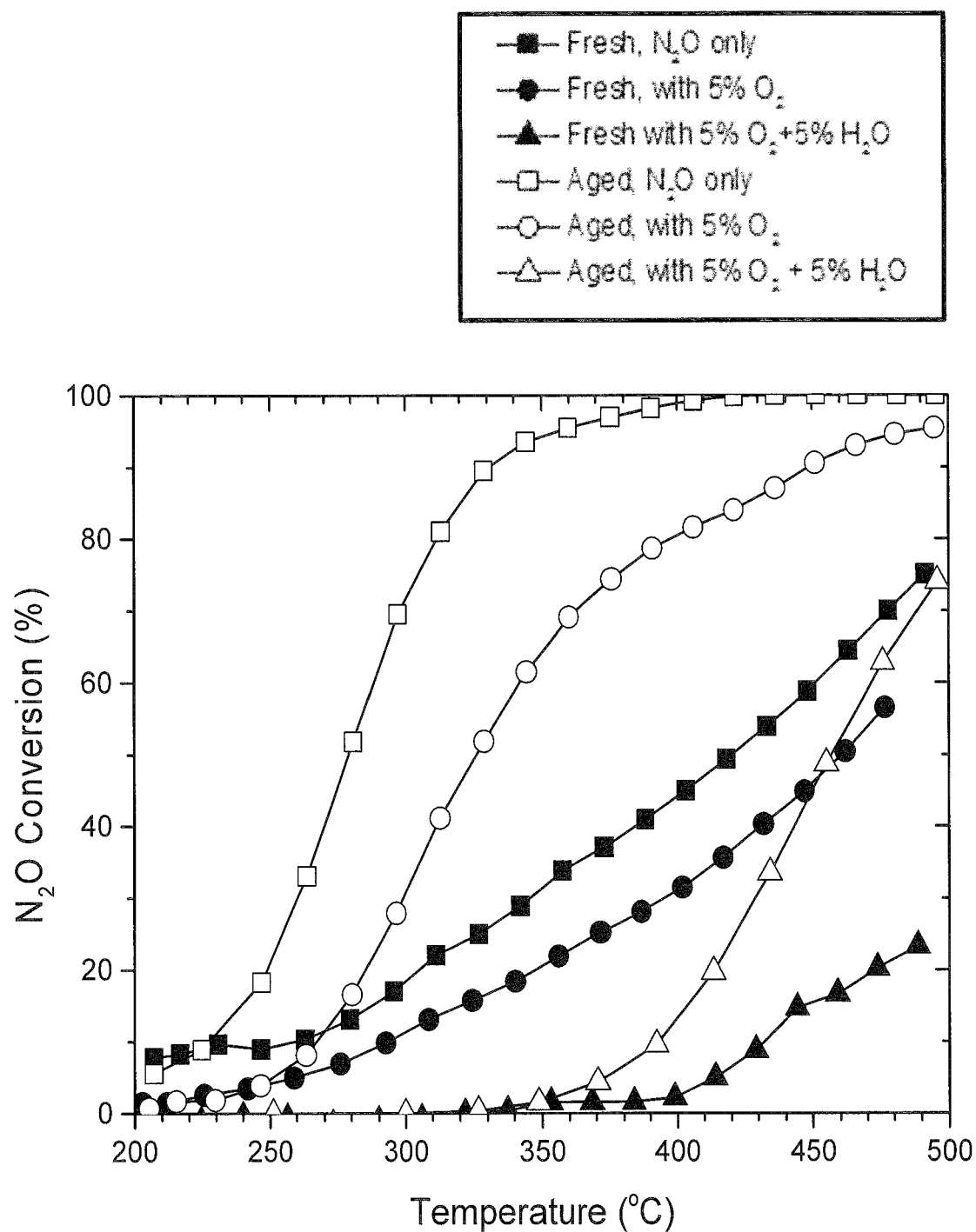
FIG. 13 provides $N_2O$ conversion versus temperature for an inventive $N_2O$ catalyst composite.

FIG. 13 provides N$_2$O activities over the monolithic catalyst composite of Example 6. The monolith data shown in FIG. 13 are in general consistent with the powder data shown in FIG. 11. However, the promotion effect by aging is more pronounced on the monolith catalyst.

Figure 14:
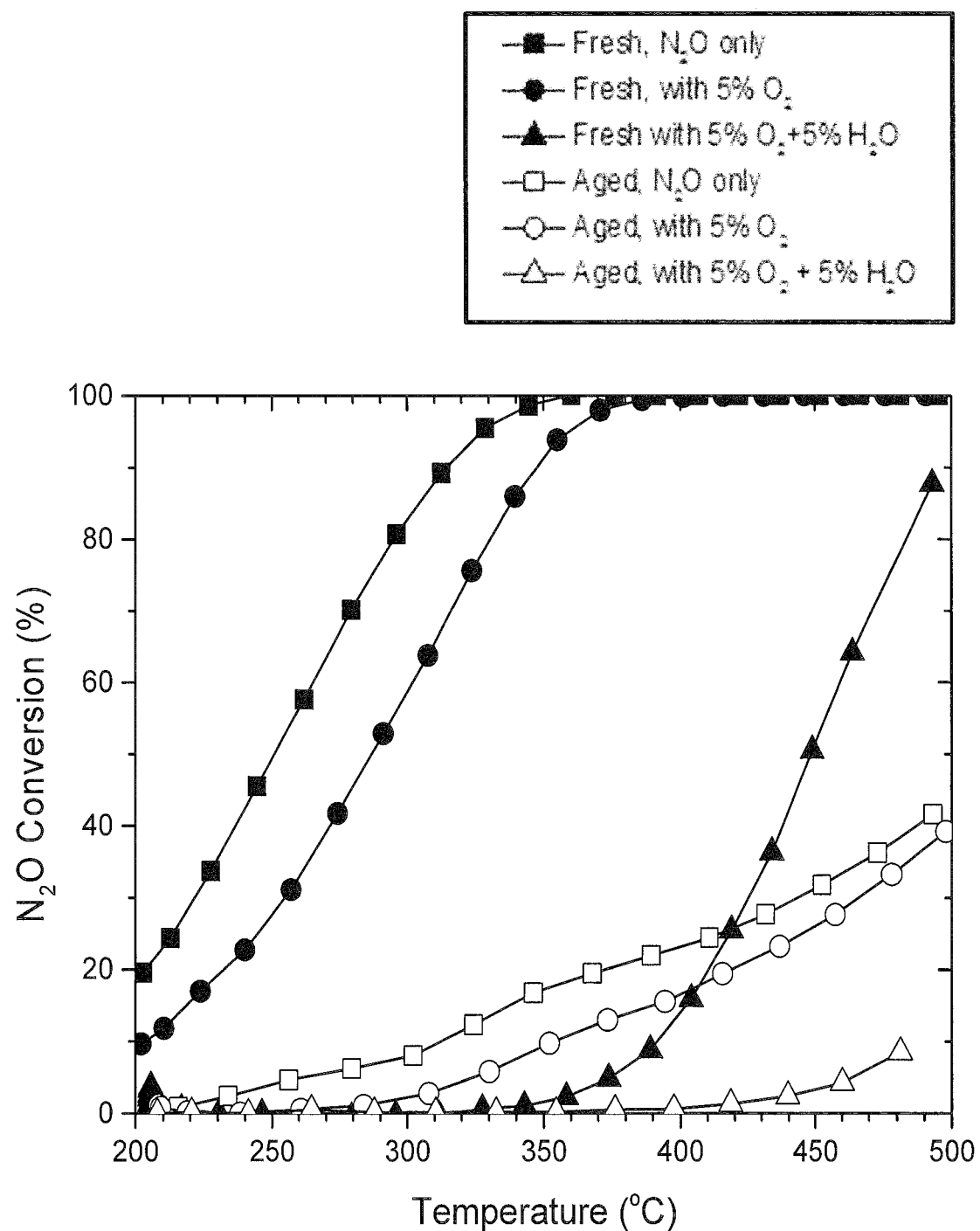
FIG. 14 provides $N_2O$ conversion versus temperature for a comparative $N_2O$ catalyst composite.

FIG. 14 provides N$_2$O activities over the monolithic catalyst of Comparative Example 7. The monolith data shown in FIG. 14 are consistent with the powder data shown in FIG. 12. Therefore, the powder data presented in FIGS. 11 and 12 as well as in Tables 3A, 3B, 3C, 5A, 5B, 5C, 7A, 7B, and 7C can represent their catalytic performance in the monolith form.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed is:

1. A method of making a nitrous oxide (N$_2$O) removal catalyst composite, the method comprising:
   depositing a rhodium precursor onto a fresh ceria-based support having a pore volume of at least about 0.20 cm$^3$/g and forming a washcoat therefrom;
   coating a substrate comprising a flow-through monolith or a wall-flow filter with the washcoat to form a coated substrate; and
   calcining the coated substrate in air at a temperature between about 600° C. and about 800° C. for at least 10 hours.

2. The method of claim 1, wherein the calcining step is carried out under conditions of 750° C. for 20 hours with 10 weight % water in air.

3. The method of claim 1, further comprising:
calcining the fresh ceria-based support at about 600° C. to about 800° C. before the depositing step.

4. The method of claim 1, wherein the temperature is 750° C.

5. The method of claim 1, wherein the calcining step is carried out for about 10 to about 30 hours.

6. The method of claim 1, wherein the calcining step is carried out for about 20 hours.

* * * * *